US012039958B2

(12) United States Patent
Hua et al.

(10) Patent No.: US 12,039,958 B2
(45) Date of Patent: Jul. 16, 2024

(54) PERCEPTUAL-DRIVEN FOVEATED DISPLAYS

(71) Applicant: Arizona Board of Regents on Behalf of the University of Arizona, Tucson, AZ (US)

(72) Inventors: Hong Hua, Tucson, AZ (US); Pengyinjie Lyu, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 0 days.

(21) Appl. No.: 18/018,549

(22) PCT Filed: Aug. 2, 2021

(86) PCT No.: PCT/US2021/044127
§ 371 (c)(1),
(2) Date: Jan. 28, 2023

(87) PCT Pub. No.: WO2022/031572
PCT Pub. Date: Feb. 10, 2022

(65) Prior Publication Data
US 2024/0013752 A1    Jan. 11, 2024

Related U.S. Application Data

(60) Provisional application No. 63/060,268, filed on Aug. 3, 2020.

(51) Int. Cl.
G09G 5/391     (2006.01)
G02B 27/00     (2006.01)
G02B 27/01     (2006.01)

(52) U.S. Cl.
CPC ......... *G09G 5/391* (2013.01); *G02B 27/0093* (2013.01); *G02B 27/0172* (2013.01);
(Continued)

(58) Field of Classification Search
CPC ........... G09G 5/391; G09G 2310/0232; G09G 2340/0428; G09G 2320/028;
(Continued)

(56) References Cited

U.S. PATENT DOCUMENTS 9,429,756 B1 * 8/2016 Cakmakci .......... G02B 27/0172
2004/0017608 A1   1/2004 Lantz
(Continued)

OTHER PUBLICATIONS

L. C. Loschky and G. W. McConkie, "Investigating spatial vision and dynamic attentional selection using a gaze contingent multiresolutional display," Q. J. Exp. Psychol. A 8, 99-117 (2002).
(Continued)

*Primary Examiner* — Brent D Castiaux
(74) *Attorney, Agent, or Firm* — Niels Haun; Dann, Dorfman, Herrell & Skillman, P.C.

(57) ABSTRACT

Devices and methods that use a perceptual-driven approach to foveated displays with the goal of offering elegant degradation of image resolution with the increase of eccentricity and eye movements. As a result, the implementation leads to minimally perceivable image artifacts and image resolution discontinuity, and may further eliminate or limit the need for an eyetracker or scanning mechanism. Hereby we refer this approach as perceptual-driven continuous foveated display in contrast to the multi-level discrete foveation approach used previously.

26 Claims, 36 Drawing Sheets

(52) U.S. Cl.
CPC ........... *G09G 2310/0232* (2013.01); *G09G 2340/0428* (2013.01)

(58) Field of Classification Search
CPC ........... G09G 2350/00; G09G 2360/16; G09G 3/001; G02B 27/0093; G02B 27/0172
See application file for complete search history.

(56) References Cited

U.S. PATENT DOCUMENTS

| 2017/0132757 | A1 | 5/2017 | Thiebaud |
| 2017/0236252 | A1 | 8/2017 | Nguyen |
| 2017/0263046 | A1 | 9/2017 | Patney |
| 2019/0075281 | A1 | 3/2019 | Hall |
| 2019/0355332 | A1 | 11/2019 | Knez |

OTHER PUBLICATIONS

W. Zhou and A. C. Bovik, "Embedded foveation image coding," IEEE Trans. Image Process. 10, 1397-1410, 2001.

A. T. Duchowski and A. Çöltekin, "Foveated gaze-contingent displays for peripheral LOD management, 3D visualization, and stereo imaging," ACM Trans. Multimedia Comput. Commun. Appl. 3, 1-21 (2007).

G. Sandini, et al, "A retinalike CMOS sensor and its applications," in Proceedings of IEEE Workshop on Sensor Array and Multichannel Signal Processing (IEEE, 2000), pp. 514-519.

D. V. Wick et al, "Foveated imaging demonstration," Opt. Express 10, 60-65, 2002.

H. Hua and S.Liu, "Dual-sensor foveated imaging system," Applied Optics, 47(3), 2007.

J. P. Rolland, et al, "High resolution inset head-mounted display," Appl. Opt. 37, 4183-4193, 1998.

Tan G, et al Foveated imaging for near-eye displays. Optics express, 26(19), 2018.

K. Iwamoto, S. Katsumata, K. Tanie, "An eye movement tracking type head mounted display for virtual reality system:—evaluation experiments of a prototype system", Proceedings of 1994 IEEE International Conference on Systems, Man, and Cybernetics. Humans, Information and Technology (Cat. No. 94CH3571-5). vol. 1, pp. 13-18, 1994.

P. Lyu and H. Hua, "Perceptual-driven approach to statically foveated head-mounted displays." Optics Express, 29(21), 33890-33914, (2021).

Burgess-Limerick R, Mon-Williams M, Coppard VL. Visual display height. Human Factors. Mar. 2000;42(1):140-50.

Cook G, Stark L. Derivation of a model for the human eye-positioning mechanism. The bulletin of mathematical biophysics. Mar. 1, 1967;29(1):153-74.

W. S. Geisler and J. S. Perry, "Real-time foveated multiresolution system for low-bandwidth video communication," Proc. SPIE 3299, 294-305 (1998).

L. C. Loschky, G. W. McConkie, H. Yang, and M. E. Miller, "The limits of visual resolution in natural scene viewing," Visual Cognition 12, 1057-1092 (2005).

D. Cheng, Y. Wang, H. Hua, and M. M. Talha, "Design of an optical see-through head-mounted display with a low f-number and large field of view using a freeform prism," Appl. Opt. 48, 2655-2668 (2009).

X. Hu and H. Hua, "Design and tolerance of a free-form optical system for an optical see-through multi-focal-plane display," Appl. Opt. 54, 9990-9999 (2015).

D. Cheng, J. Duan, H. Chen, H. Wang, D. Li, Q. Wang, Q. Hou, T. Yang, W. Hou, and D. Wang, "Freeform OST-HMD system with large exit pupil diameter and vision correction capability," Photonics Res. 10, 21-32 (2022).

* cited by examiner

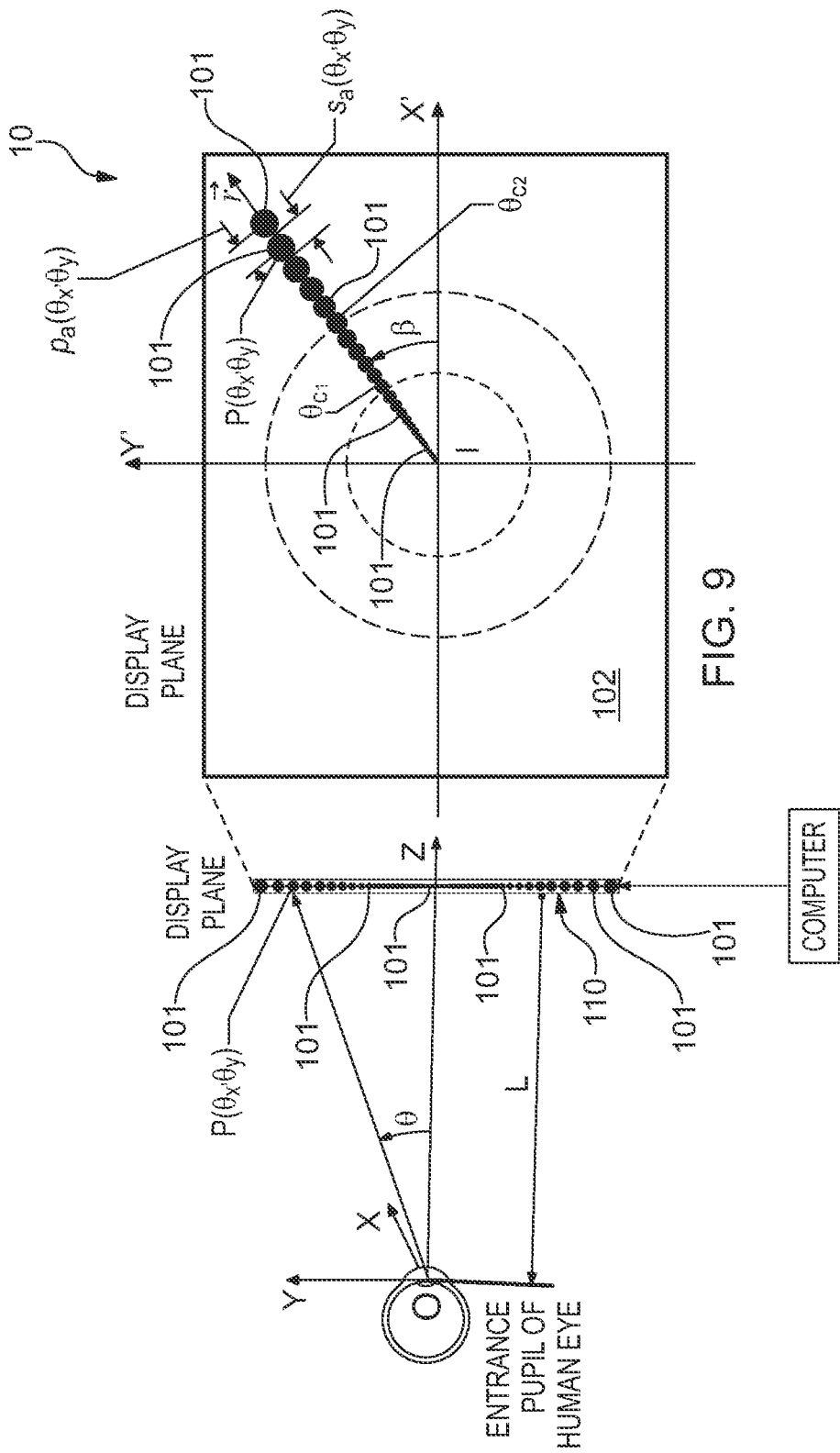

PERCEPTUAL-DRIVEN FOVEATED DISPLAYS

RELATED APPLICATIONS

This application is a national stage application under 35 U.S.C. 371 for International Application No. PCT/US21/44127, filed on Aug. 2, 2021, which claims the benefit of priority of U.S. Application No. 63/060,268, filed on Aug. 3, 2020, the entire contents of which application are incorporated herein by reference, the entire contents of which application(s) are incorporated herein by reference.

FIELD OF THE INVENTION

The present invention relates generally to perceptual-driven continuously foveated displays, and more particularly, but not exclusively, such displays where the location of the pixels on the display is distributed according to a specified angular pixel density function.

BACKGROUND OF THE INVENTION

Head-mounted displays (HMD) have been developed for many successful applications such as training, medical education, navigation, and others. Conventional HMD designs adopt the well-established rectilinear sampling method dominantly used for 2D display and imaging systems in which a finite number of pixels are spread evenly across an entire field of view. As a result, they are subject to the inherent trade-off between field of view (FOV) and resolution in the sense that for a given number of pixels the larger the FOV of an HMD is, the lower the angular resolution it is. For instance, consider a HMD design with an FOV of 120 degrees in its horizontal direction and a typical high-definition (HD) display device of 1920×1200 pixels. By spreading the 1920 pixels evenly in the horizontal direction, the angular resolution of a conventional HMD design system is about 3.75 arc minutes. Achieving an angular resolution of 1 arc minutes based on the same sampling method would require a display device of 7200×4500 pixels and require data bandwidth 14 times of a typical HD device. Such high-resolution displays are not only very challenging to produce, but also computationally challenging to process, transfer, and store such images. Besides these technical challenges, the rectilinear sampling scheme is very inefficient. It leads to large amount of redundant data for the human visual system to process because the visual acuity (VA) of the peripheral vision of the human eye drops off drastically beyond the fovea region in retina to perceive. For instance, a 4K display based on a rectilinear sampling scheme only can support an HMD of 66 degrees circular FOV to achieve 1 arcminute angular solution matching with the resolution of 20/20 normal vision of human eyes, while about over 88% of the rendered information is not perceived by the human visual system at a given time instance.

To mitigate the trade-off between FOV and resolution, a foveated display, inspired by the foveation properties of the human eye, can be generally characterized as a method that identifies a users' region of interest (ROI) and allocates the limited resources, such as a finite number of pixels or data processing and transmission bandwidth, differently between the ROI and the peripheral area outside the ROI region. For example, the number of pixels allocated to a display region is a function of its distance to the center of the region of interest. The ROI may be determined by means of a gaze tracker, by tracking the salient points of scene rendered by the display, by pre-determining the ROIs of the scene, or by other mechanisms. A foveated display is often referred to as gaze-contingent or eyetracked multi-resolution techniques.

Many efforts have been made to apply foveation techniques in imaging and display applications. These prior research works on foveation techniques fall into one of three categories. The first category of work is experimental research on the perception and cognition to understand visual processing and perceptual artifacts produced by software simulated multi-resolution images. For instance, Loschki and McConkie investigated perceptual artifacts, such as perceptible image blur and image motion when viewing simulated foveated multi-resolution displays. The second category of work is an algorithmic approach in which foveation techniques are applied primarily to spatially variant image processing and video encoding and variable levels of detail graphics rendering to achieve real-time video communication and save data processing resources. In this approach, the display or imaging sensor hardware has a uniform high resolution, but the resolution of the rendered image is reduced away from the attended ROI. The third category of work takes a hardware approach, in which various imaging sensors or displays with spatially varying resolution are developed to reduce the requirements for high-resolution detectors and displays or high-quality and complex optical systems. For example, in the applications to imaging systems, Sandini et al described the implementation of a retina-like complimentary metal-oxide semiconductor (CMOS) sensor characterized by spatially variant resolution similar to that of the human retina and demonstrated that 35 times fewer pixels were needed in the spacevariant resolution sensor as compared with a constant high-resolution image of 1100×1100 pixels. Wick et al. presented the designs of foveated imaging systems in which a liquid crystal (LC) spatial light modulator (SLM) was used to dynamically correct the optical aberrations of a simple-structure wide FOV optics at the foveated region of interest (FRoI). Hua and Liu experimentally demonstrated a dual-sensor foveated imaging architecture where two separate imaging paths, one for foveal vision and one for peripheral vision, were integrated to capture foveated images and the high-resolution imaging path was steered by a 2D MEMS scanner according to the A-AOI, mimicking the eye movement of the human visual system (HVS). In the applications to display systems, Rolland presented the conceptual design of a head-mounted display with a high-resolution inset region where the high-resolution inset region can be optically relocated to different locations. More recently, Tan et al demonstrated a dual-resolution HMD design example with two display panels of different optical magnifications as the image sources and a switchable Pancharatnam-Berry phase deflector for shifting the position of the foveated view.

A foveated display is a promising technique to realize a large FOV and high resolution at the same time in a display system design, yet only very few works exist in exploring a foveated display design, especially to foveated HMD designs. Among the limited prior works summarized above that attempted to apply a foveation method to the hardware design of an HMD system, the common method for implementing a foveated HMD is a dynamic discrete foveation approach where a foveated region offering a higher image resolution is dynamically steered in response to a user's gaze direction and a relatively low-resolution region offers peripheral awareness. Such dynamic foveation method typically utilizes a dual-display architecture in which two displays of different pixel resolutions or two different optical paths of different optical magnifications are utilized to render the foveated area and peripheral area with two different resolutions. The foveated area with high resolution typically covers a small (e.g. less than 10 degrees) FOV while the peripheral area covers a substantial portion of the entire FOV. The existing dual-display method also requires a mechanism to determine an instantaneous ROI toward which the display of higher resolution is aimed. In a dynamically foveated display, an eye tracking is used to track the line of sight of a viewer and thus determine the attended ROI in real-time where a high-resolution image is rendered optically or digitally, while a low-resolution image is rendered for the background or peripheral region. Finally, the existing dual-display architecture requires a scanning method to optically or mechanically steer and align the high-resolution foveated display approximately with the viewer's line of sight to achieve the goal of foveated rendering. For example, Iwamoto et al demonstrated a bench prototype of a foveated display which used the eyetracked gaze point to control 2D opto-mechanical scanners to dynamically control the position of a high-resolution inset image over a wide FOV low-resolution background display. Rolland et al reported a high-resolution inset HMD system, in which a pair of microlens arrays optically duplicates a high-resolution inset image over a background display and a liquid crystal shutter is used to select one of the copies corresponding to the gazed ROI and block the others instead of using mechanically moving parts for scanning. In the more recent dual-resolution display system demonstrated by Tan et al, a switchable phase deflector was used to optically shift the position of the foveated image.

Although a foveated HMD design based on such dual-display architecture made some progress as described above, this kind of foveated display is inevitably complex, high cost, large volume, and heavy weight because multiple displays and imaging paths are necessary to render multi-level resolution displays, an eye tracking device is required to track ROI, and a 2D steering mechanism, either mechanical or optical, is required for steering the foveated region. Finally, the multi-resolution approach provides multiple discrete samples of resolution and thus discontinuous perception of image quality as eye moves, leading to visual artifacts.

SUMMARY OF THE INVENTION

In this invention, we present a new perceptual-driven approach to the design of foveated displays with the goal of offering elegant degradation of image resolution with the increase of eccentricity and eye movements. As a result, the implementation leads to minimally perceivable image artifacts and image resolution discontinuity, and may further eliminate or limit the need for an eyetracker or scanning mechanism. Hereby we refer this approach as perceptual-driven continuously foveated display in contrast to the multi-level discrete foveation approach in the prior art. This perceptual-driven method potentially enables the realization of large FOV and high resolution without the need or with limited need of eye tracker and scanning mechanisms. We also present a new method to evaluate the data saving efficiency and perceived image resolution and quality as a function of eye gaze direction. We further demonstrate the application of the proposed approach to embodiment designs of foveated displays, and experimentally demonstrate the implementation and effectiveness of the proposed method.

In one of its aspects the present invention may provide a perceptual-driven continuously foveated display with specified resolution across the display. The display may include a display plane with a plurality of pixels, where the location of the pixels on the display is distributed according to the angular pixel density function whereby transition artifacts located at transitions between adjacent segmented functions is minimized. The function may be given by the equation $$F_{FD}(\theta_x, \theta_y) = \begin{cases} f_1(\theta_x, \theta_y) & \text{when } \theta \leq \theta_{C1}(\vec{r}) \\ f_2(\theta_x, \theta_y) & \text{when } \theta_{C1}(\vec{r}) \leq \theta \leq \theta_{C2}(\vec{r}) \\ f_3(\theta_x, \theta_y) & \text{when } \theta_{C2}(\vec{r}) \leq \theta \leq \theta_{C3}(\vec{r}), \\ \quad \cdots \\ f_{N+1}(\theta_x, \theta_y) & \text{when } \theta \geq \theta_{CN}(\vec{r}) \end{cases}$$

where $\theta$ is the field angle of a pixel position P on the display plane along a given direction $\vec{r}$ and $\theta$ is defined as the angular deviation of the pixel position from a Z-axis perpendicular to the display plane of the OXYZ reference system in the unit of degrees.

$\theta_x$ and $\theta_y$ correspond to an X-component and a Y-component of the field angle $\theta$ in the horizontal (X) and vertical (Y) directions, respectively; N is the number of critical balance points (N≥1).

$\theta_{C1}(\vec{r})$, $\theta_{C2}(\vec{r})$, ..., and $\theta_{CN}(\vec{r})$ are the balance points arranged along the given radial direction $\vec{r}$ in the order from the smallest to the largest angular distance from the center I.

$f_1, f_2, \ldots f_{N+1}$ are N+1 segmented functions that characterize the relative resolution distribution within each corresponding region, and $f_1(\theta)=f_2(\theta)$ when $\theta=\theta_{C1}$.

The perceptual-driven continuously foveated display may include a microdisplay and an eyepiece configured to create a virtual image of the microdisplay, wherein the virtual image includes images of the pixels spaced according to the angular pixel density function $F_{FD}$. The microdisplay may include pixels spaced according to the angular pixel density function or the pixels may be spaced with a uniform pixel pitch. The microdisplay may be curved. The eyepiece may include a lens with spatially varying optical power. The perceptual-driven continuously foveated display may include a fiber taper optically coupled to the microdisplay, and fiber taper may be curved. A perceptual-driven continuously foveated display may include a center point and a plurality of pixels, with the pixel size and pitch increasing away from the center point of the display along a line extending in a radial direction away from the center point of the display. The resolution of the display monotonically may decrease along the radial direction from the center point of the display.

BRIEF DESCRIPTION OF THE DRAWINGS

The foregoing summary and the following detailed description of exemplary embodiments of the present invention may be further understood when read in conjunction with the appended drawings, in which:

FIG. 9 schematically illustrates an exemplary configuration of direct-view foveated display layout in accordance with the present invention;

DETAILED DESCRIPTION OF THE INVENTION

Method for Foveated Display Design

Figure 1:
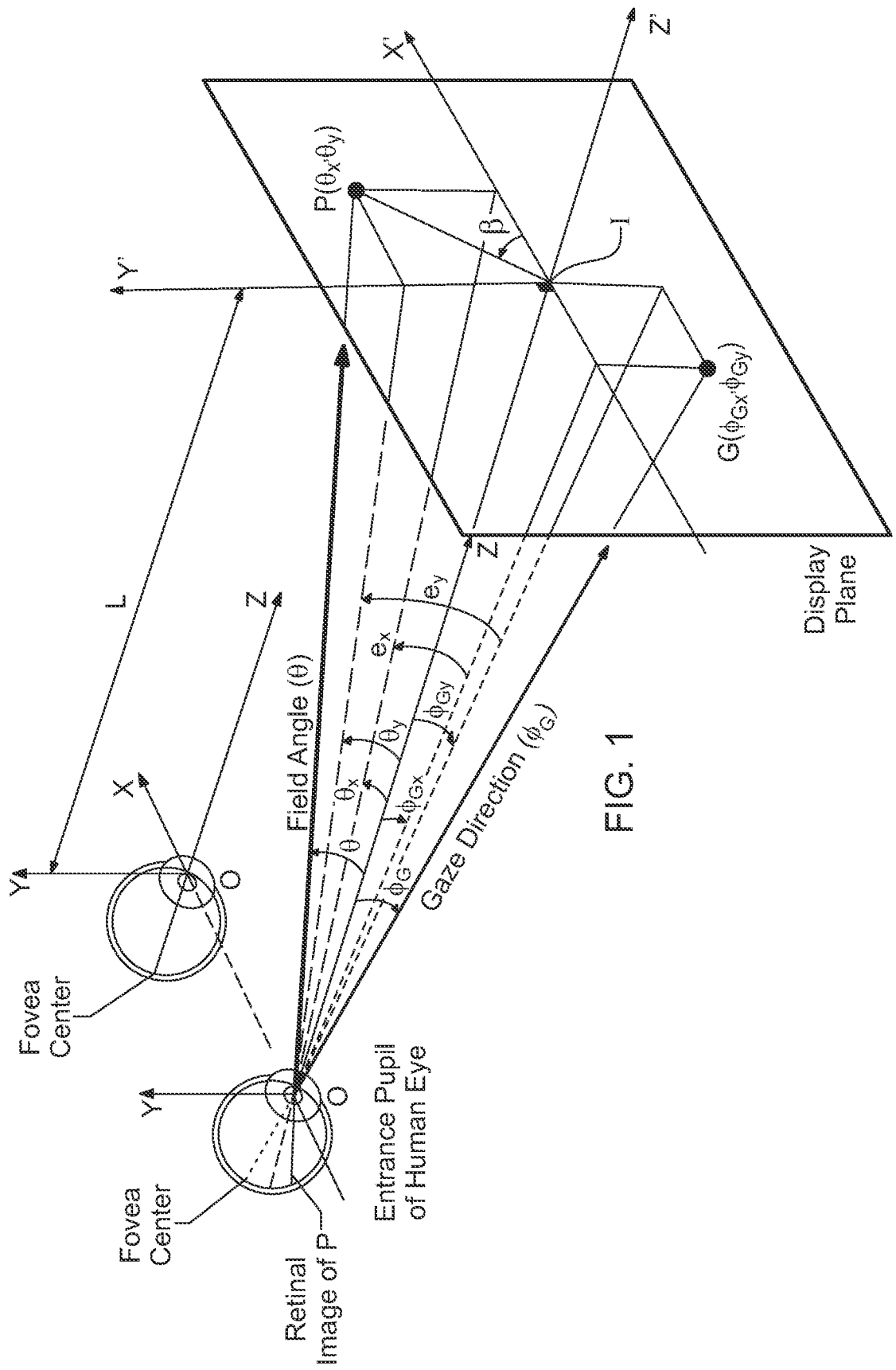
FIG. 1 schematically illustrates reference coordinate systems and geometric relationships between a viewer and a display plane.

In the human visual system only a narrow region around the fovea offers exceptional resolution, contrast, and color sensitivity, while these properties fall off rapidly with an increasing retinal eccentricity which is defined as the angular distance of a field point from the fovea center and measured by an eccentricity angle. It is known that the object field along a viewer's line of sight (LoS) is imaged at the fovea center and the human visual system adapts the LoS toward the attended region of interest through eye movements. Therefore, the line of sight in the visual space or the fovea center in the retina space, which is often assumed to be the point of reference for measuring eccentric angle of field positions, dynamically changes with eye movement. For convenience referring now to the figures (wherein like elements are numbered alike throughout), as illustrated in FIG. 1, we define a reference coordinate system OXYZ in the visual space, where the origin O is located at the center of the entrance pupil of the eye, Z axis is along the corresponding LoS when the eye gaze direction is parallel to the direction of head pose (in other words, no eye movements are engaged in both horizontal and vertical directions and the eye is gazing naturally straight forward), the OXY plane is perpendicular to Z-axis, and the Y axis is pointing upward. We further define a secondary reference coordinate system IX'Y'Z' on the display plane which is viewed by the eye. The origin I is the intersection of the Z-axis of the OXYZ reference with the display plane, and the X'-, Y', and Z' axes are parallel to the X-, Y, and Z-axes, respectively. The display plane IXY is displaced from the OXY plane by a distance L along the Z-axis. The display plane here can be configured as a direct-view display where no additional optical components are inserted between the viewer and display plane for the purpose of modifying the light ray propagation with the exception of eyeglasses a viewer may wear for vision correction. In the case of direct-view display, the display plane can simply be one or multiple display devices composed of an array of pixels or be a physical screen upon which light patterns rendered on display devices with an array of pixels are projected. Alternatively, the display plane can also be configured as a non-direct-view display system, such as a head-mounted display, where an optical system, commonly referred to as an eyepiece, is inserted between the viewer and a display source. In a non-direct-view display, the display plane here is considered to be the conjugate virtual image of the display source seen by the viewer through the optical system.

Let us consider the eye is gazing at a point G on the display plane, which is defined as the gaze direction $\phi_G$, where $\phi_G$ is the angle of eye rotation with respect to the Z-axis or straight gazing direction in the unit of degrees. The eye rotation angle, $\phi_G$, as illustrated in FIG. 1, may be decomposed into two orthogonal components, ($\phi_{Gx}$, $\phi_{Gy}$), corresponding to the X-component and Y-component eye rotations in the horizontal and vertical directions, respectively. Let us further consider a given field position P on the display plane. The field position P may be specified by its field angle, $\theta$, which is defined as the angular deviation of the field position, P, from the Z-axis of the OXYZ reference system in the unit of degrees and $\theta=0$ corresponds to the direction matching with the Z-axis of the OXYZ reference coordinate system. As illustrated in FIG. 1, the field angle $\theta$ may be decomposed into two orthogonal components, ($\theta_x$, $\theta_y$), corresponding to the X-component and Y-component angular deviations in horizontal and vertical directions, respectively. On the display plane, the field position P may also be characterized by its angular deviation, $\beta$, from the IX' axis, as illustrated in FIG. 1. The X- and Y-component of the field angle, ($\theta_x$, $\theta_y$), may be expressed as $\theta_x$=arctan(cos $\beta \cdot |\tan \theta|$), and $\theta_y$=arctan(sin $\beta \cdot |\tan \theta|$). The relative visual acuity (VA) of the human visual system (HVS), denoted as $VA_{HVS}$, describes the resolution distribution as a function of the eccentricity angle of a given visual field, $\theta$, from the eye gaze direction, $\phi_G$. The relative visual acuity is defined as the normalized reciprocal of the angular resolution in minutes of arc and may be modeled as $$VA_{HVS}(\theta_x,\theta_y,\phi_{Gx},\phi_{Gy})=e_2/(e_2+\sqrt{(\theta_x-\phi_{Gx})^2+(\theta_y-\phi_{Gy})^2}) \quad (1)$$

where $e_2 \approx 2.3$, $\theta_x$ and $\theta_y$ correspond to the X-component and Y-component angular deviations of a field position P in horizontal and vertical directions, respectively, $\phi_{Gx}$ and $\phi_{Gy}$ correspond to the X-component and Y-component eye rotations in the horizontal and vertical directions, respectively. The eccentricity angles, ($e_x$, $e_y$), of the given field from the fovea center are given as $e_x=\theta_x-\phi_{Gx}$ and $e_y=\theta_y-\phi_{Gy}$ in the horizontal and vertical directions, respectively.

Figure 2:
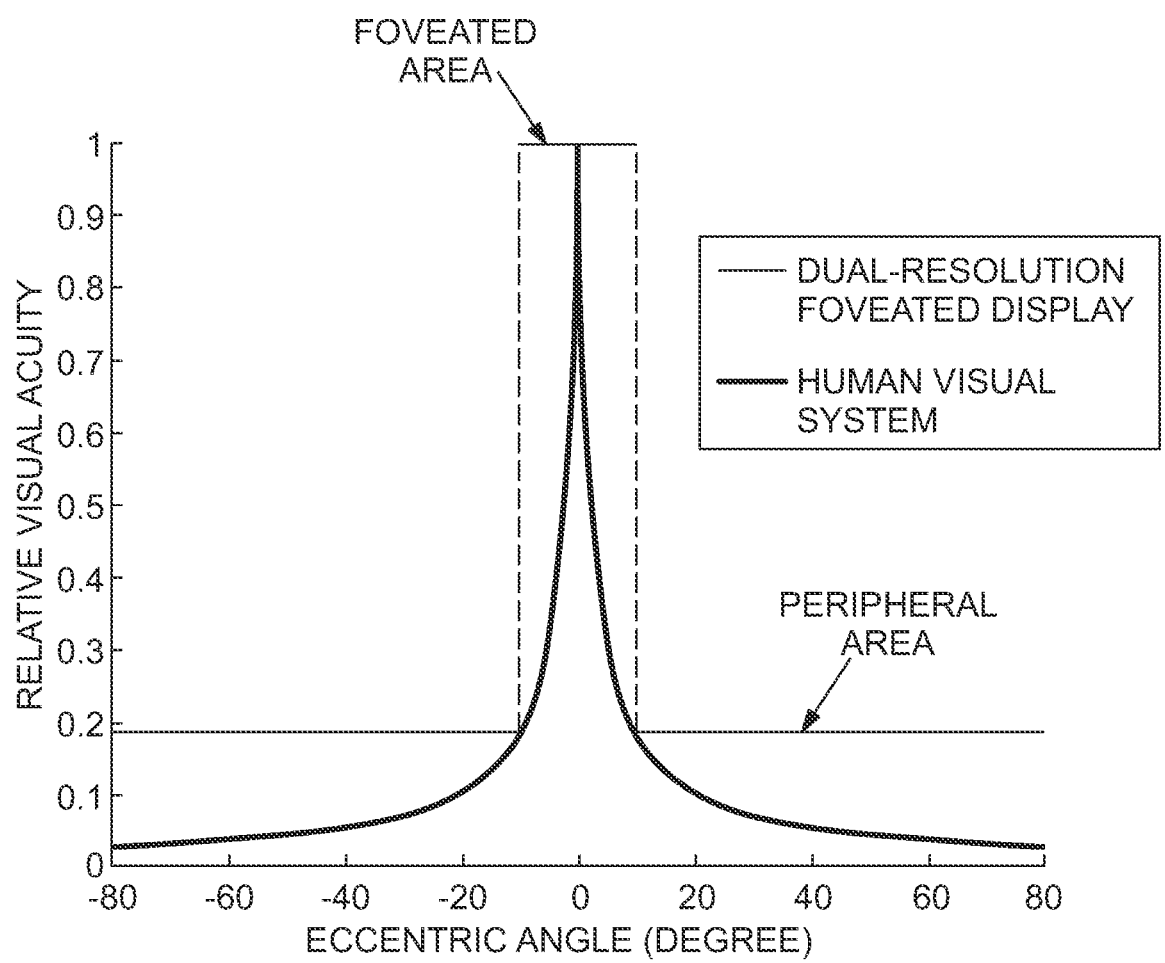
FIG. 2 illustrates relative visual acuity (VA) as function of eccentric angle of human and dual-resolution foveated display.

Due to the structure of retina and inherent eye movement capability, we anticipate that a true foveated display is able to dynamically redistribute its finite number of pixels in such a fashion that its angular pixel density follows the same distribution function depicted in Eq. (1) and is able to dynamically steer its foveated region within the limits of eye movements such that the relative VA function depicted in Eq. (1) is always centered at fovea. As explained in the background, a few practical implementations of such dynamic foveation display schemes have been demonstrated based on dual-display architecture accompanied by either 2D opto-mechanical or optical scanners. In these dual-display dynamic foveation schemes, as illustrated in FIG. 2, the continuous VA function in Eq. (1) is divided into two discrete regions of different resolutions, namely a narrow-angle foveated area and a wide-angle peripheral area. In the example shown in FIG. 2, the foveated region offers a high angular resolution of 1 arc minutes (VA=1) and covers the field range of ±10° while the peripheral region offers a low resolution of about 5 arc minutes which matches the VA value of the HVS at 10° eccentricities away from center (i.e. VA=0.2) and covers the fiend range between ±10° and ±80°. The center of the foveated area is dynamically steered to match the line of sight or eye gaze. The obvious drawbacks to such dual-resolution scheme are the perceivable artifacts of resolution discontinuity due to discrete samples and cumbersome hardware required for implementing two optical paths and 2D scanning mechanism.

Although the multi-resolution foveation scheme may be a good solution, it takes too much toll on the hardware complexity as dynamic foveation and eyetracking are required, and it yields perceivable artifacts of resolution discontinuity. We propose a perceptual-driven continuous foveation approach where the characteristics of eye and head motions and perceived visual effects are taken into account for designing an optimal foveation function such that the perceived quality of a foveated display degrades elegantly or even imperceptible during the course of eye movement. As later demonstrated in this disclosure, such continuous foveation approach can be implemented in the process of optical design by providing spatially varying optical magnification in optical systems or spatially varying resolution and magnification in display sources.

Figure 3:
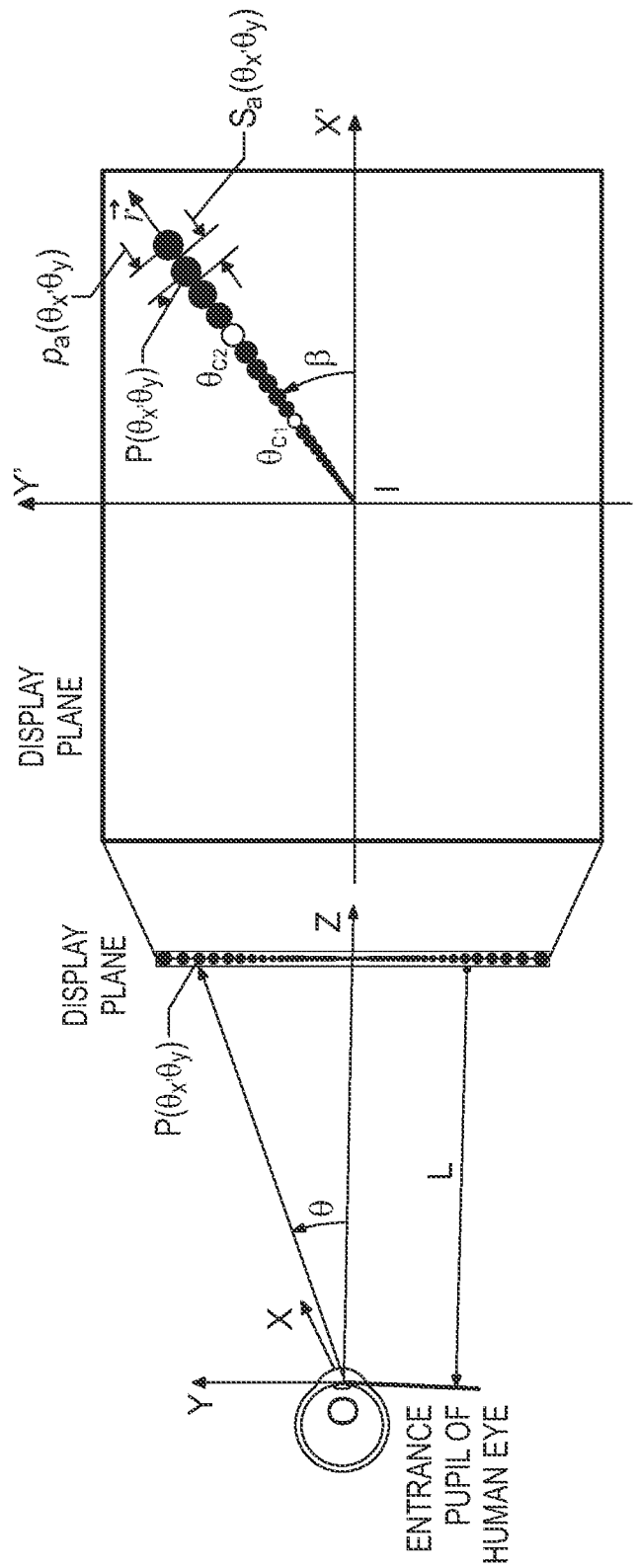
FIG. 3 schematically illustrates an exemplary configuration of a continuously foveated display in accordance with the present invention where its relative angular resolution varies as the function of the field angle $\theta$.

A perceptual-driven continuously foveated display is schematically illustrated in FIG. 3. On the display plane, comprising an array of pixels, a reference coordinate system IX'Y'Z' is defined, where the origin I is a center reference position on the display plane and also represents the intersection of the Z-axis of the OXYZ eye reference with the display plane, and the X'-, Y', and Z' axes are parallel to the X-, Y, and Z-axes, respectively. Along a given radial direction, $\vec{r}$, passing through the reference center I of the display plane, the pixel size, s, and pixel pitch, p, on the display plane increases as the distance of the pixel from the center increases. The radial direction $\vec{r}$ on the display surface may be characterized by its angular deviation, $\beta$, from the IX' axis, where $0°\leq\beta\leq360°$. The position of a given pixel, P, along the radial direction $\vec{r}$ may be characterized by the corresponding field angle, $\theta$, with respect to the eye reference OXYZ, which is defined as the angular distance of the pixel position, P, from the reference center I or equivalently the angular deviation from the Z-axis of the OXYZ reference system. The relative pixel density of the display along the given direction $\vec{r}$ may be characterized by the relative angular resolution distribution function, denoted as $F_{FD}$, which is defined as the normalized reciprocal of the angular resolution of the display in minutes of arc, which stands for the pixel density per unit angle. In general, the relative angular resolution distribution of the display system along the given radial direction may monotonically decrease from the center of the display as the position of a given pixel, P, deviates away from the center I, but the rate of degradation, which is characterized by the slope of the relative resolution distribution curve, may vary with the field position. The relative angular resolution distribution of the display may be characterized by a single continuous function. Alternatively it may be divided into multiple functional regions segmented by N critical balance points, $\theta_{C1}(\vec{r})$, $\theta_{C2}(\vec{r})$ ..., and $\theta_{CN}(\vec{r})$, ($N\geq1$) along the given radial direction $\vec{r}$. These balance points are arranged in the order from the smallest to the largest angular distance from the center I. In general, the relative angular resolution distribution of the proposed foveated display along a given direction $\vec{r}$ may be characterized by a segmented function as $$F_{FD}(\theta_x, \theta_y) = \begin{cases} f_1(\theta_x, \theta_y) & \text{when } \theta \leq \theta_{C1}(\vec{r}) \\ f_2(\theta_x, \theta_y) & \text{when } \theta_{C1}(\vec{r}) \leq \theta \leq \theta_{C2}(\vec{r}) \\ f_3(\theta_x, \theta_y) & \text{when } \theta_{C2}(\vec{r}) \leq \theta \leq \theta_{C3}(\vec{r}) \\ \phantom{f_1(\theta_x, \theta_y)} \vdots \\ f_{N+1}(\theta_x, \theta_y) & \text{when } \theta \geq \theta_{CN}(\vec{r}) \end{cases} \quad (2)$$

where as illustrated in FIGS. 1 and 3, $\theta$ is the field angle of a pixel position P on the display plane along the given direction $\vec{r}$ and is defined as the angular deviation of the pixel position from the Z-axis of the OXYZ reference system in the unit of degrees, $\theta_x$ and $\theta_y$ corresponds to the X-component and Y-component of the field angle $\theta$ in the horizontal and vertical directions, respectively, and $f_1$, $f_2$, ... $f_{N+1}$ are N+1 segmented functions that characterize the relative resolution distribution within each corresponding region. The X- and Y-component of the field angle, $(\theta_x, \theta_y)$, may be expressed as $\theta_x$=arctan(cos $\beta\cdot$|tan $\theta$|), and $\theta_y$=arctan (sin $\beta\cdot$|tan $\theta$|), where $\beta$ is the angular deviation of the pixel P or equivalently the direction $\vec{r}$ from the IX' axis on the display plane. One of the distinct features of the proposed scheme compared to the prior dual-resolution foveation scheme is its ability to ensure continuous change of relative resolution distribution. To ensure resolution continuity and image smoothness near the center of the display, which help to minimize transition artifacts across the center region, the function values at the first critical balance point, $\theta_{C1}(\vec{r})$, need to be equal. In the words, we shall ensure the following condition satisfied:

$$f_1(\theta)=f_2(\theta) \text{ when } \theta=\theta_{C1}. \quad (3\text{-}1)$$

To achieve further continuity and smoothness of the relative resolution distribution between two adjacent regions along the radial direction, which help to minimize transition artifacts across the regions, the function values at the corresponding critical balance point of the regions need to be equal. For instance, to achieve resolution continuity at a given critical balance point, $\theta_{Ci}(\vec{r})(2\leq i\leq N)$, we shall further have the following conditions satisfied:

$$f_i(\theta)=f_{i+1}(\theta) \text{ when } \theta=\theta_{Ci}. \quad (3\text{-}2)$$

According to the relative angular resolution distribution function defined in Eq. (2) and (3), the number of critical balance points required for a given radial direction on the display is not limited to the points, $\theta_{C1}$ and $\theta_{C2}$, as illustrated in FIG. 3 and may be extended to as many critical points as needed for minimizing perceivable artifacts, which depends on the needs of applications as well as user characteristics. The resolution distribution functions, $f_1$, $f_2$, ... $f_{N+1}$ do not have to be symmetric about the reference center I or the X- or Y-axes of the coordinate system on each side of the reference center and the critical points may not be symmetric.

Figure 4A:
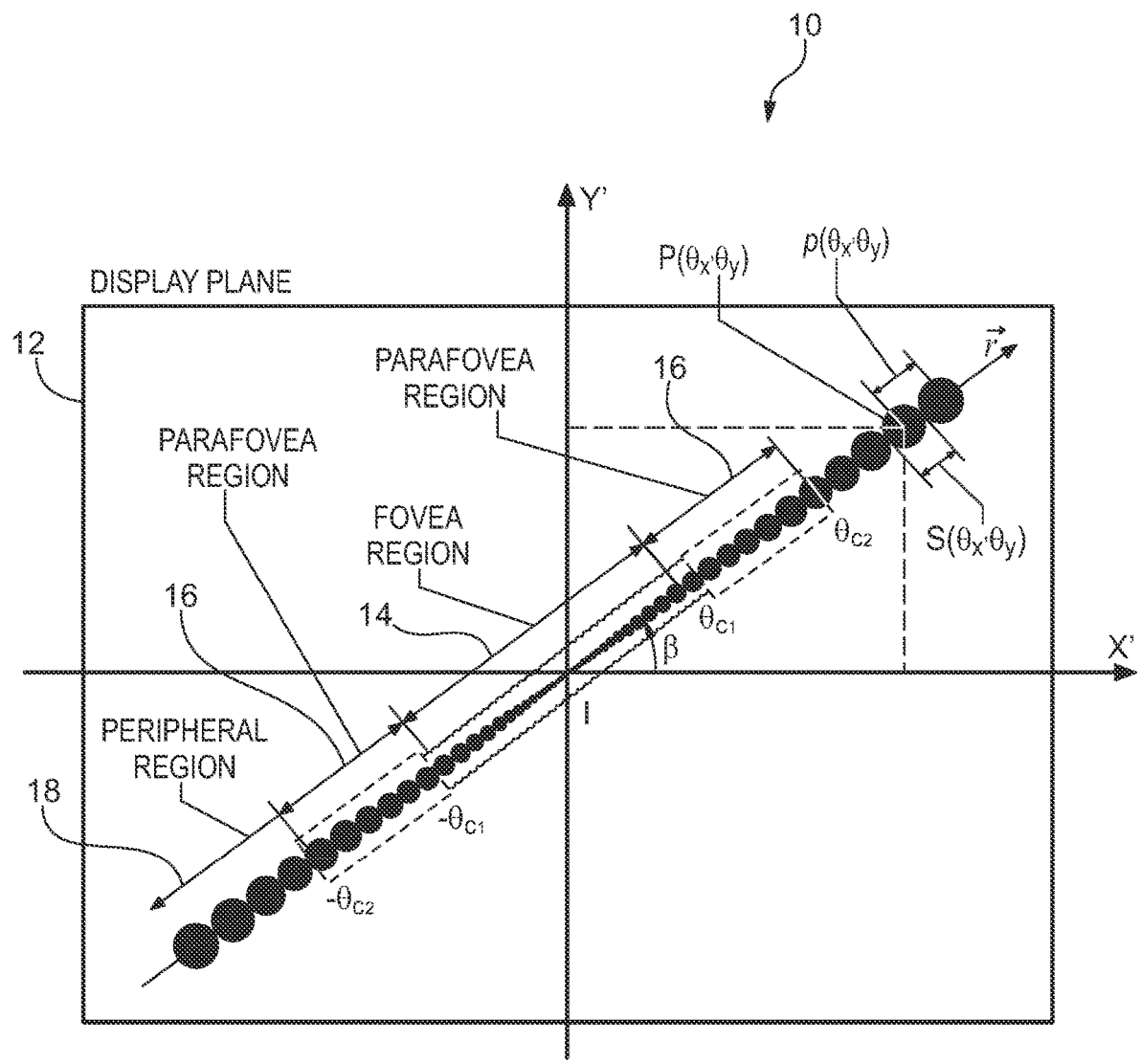
FIG. 4A schematically illustrates an exemplary configuration of a continuously foveated display in accordance with the present invention where the display's relative angular resolution varies as the function of the field angle θ and is symmetric about the image center I.
Figure 4B:
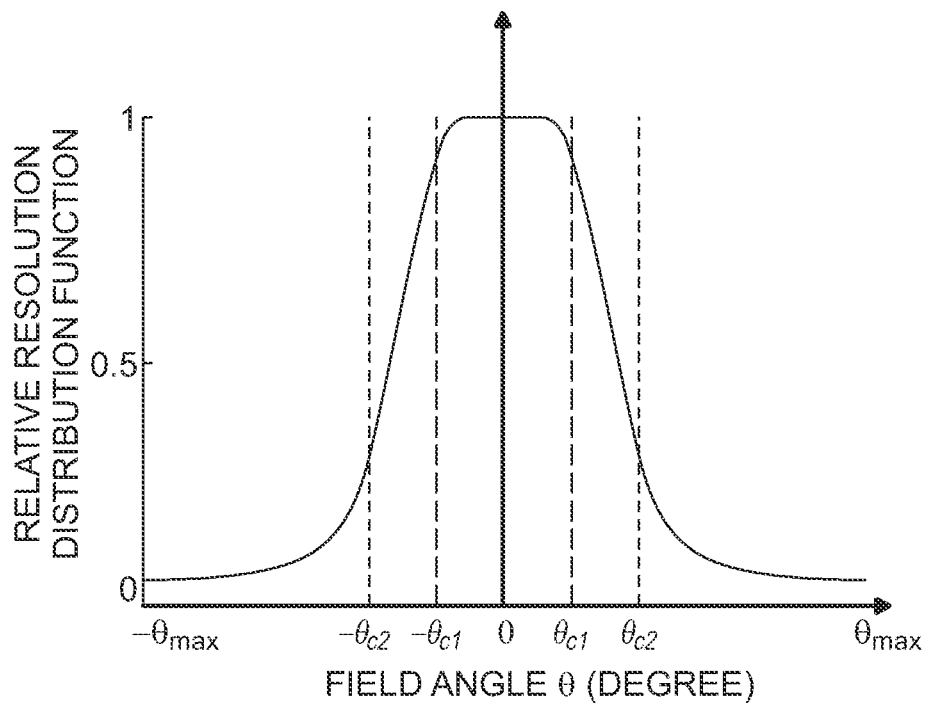
FIG. 4B illustrates a plot of a relative resolution distribution function along a given direction, $\vec{r}$, crossing the display center I as a function of the field angle.

Many forms of resolution distribution functions may be utilized to satisfy the Eq. (2) and (3). One of the key aspects for implementing the proposed method is to optimize the choices of the critical balance points as well as the relative resolution distribution functions for the different regions by accounting for the statistical characteristics of eye and head motion, the perceived performance change as a function of eye motion, and data saving efficiency. FIG. 4A shows a schematic illustration of a continuously foveated display 10 in accordance with the present invention where the display plane 12 is divided into three functional regions: a fovea region 14, a parafovea region 16, and a peripheral region 18. All three regions 14-16 are centered with the display center I. The scheme further assumes the pixel distribution along a given radial direction, $\vec{r}$, and its opposite direction $-\vec{r}$ is symmetrical to the image center I such that. This assumption of symmetry is reasonable for most application as the eye motion of the human visual system is generally symmetric around the Z-axis of the OXYZ system. FIG. 4B schematically illustrated the relative resolution distribution function (i.e. angular pixel density), $F_{FD}$, along the radial direction $\vec{r}$ as a function of the field angle, $\theta$. The plot in FIG. 4B assumes the pixel distribution along the given radial direction is symmetrical to the image center I. Similar to the fovea of the retina, the fovea region of the display along the given radial direction, $\vec{r}$, is bounded by a pair of symmetric critical balance points, $-\theta_{c1}$ and $+\theta_{c1}$. The fovea region is statically fixed at the center region of the display and offers a nearly uniformly sampled resolution with zero degradation or very slow rate of degradation to ensure the perceived image resolution remains high when the eye gaze direction, $\phi_G$, falls within this region. The outer boundary of the fovea region, $\pm\theta_{c1}$, is considered as the visual and musculoskeletal critical balance point within which frequent and comfortable eye movements are expected to occur. Based on the physiological characteristic of the human eye motion, a preferred choice for $\pm\theta_{c1}$, is between $\pm 5°$ and $\pm 20°$. For instance, Burgess-Limerick et al reported that comfortable eye movement occurs within a field angle of $\pm 15°$ for a good compromise between visual and musculoskeletal needs. The parafovea region of the display is bounded by two pairs of symmetrical balance points, $\pm\theta_{c1}$ and $\pm\theta_{c2}$, centered with the image center I. It is immediately adjacent to the fovea region offers a medium rate of degradation in resolution when the eye gaze direction, $\phi_G$, falls within this region. The outer boundary of the parafovea region, $\pm\theta_{c2}$, is considered as the critical balance point between head motion and eye movement. Within the angular range of $\pm(\theta_{c1}, \theta_{c2})$, eye movement is expected to be gradually less preferred than an alternative choice of head motion due to muscular strain and discomfort. Based on the physiological characteristics of the eye motion and head motion, a preferred choice for $\pm\theta_{c2}$, is between $\pm 20°$ and $\pm 35°$. For instance, Cook and Stark reported that head motion instead of eye movement likely occurs when the field angle is greater less than $30°$. Considering this factor, the display resolution within the angular range of $\pm(\theta_{c1}, \theta_{c2})$ is expected to degrade at a rate such that the perceived resolution is still relatively high when the eye is gazed within this region. The peripheral region of the display is the region immediately next to the parafoveal region where the field angle is greater than $\pm\theta_{c2}$. It offers a rapid rate of degradation in resolution and mainly serves the purpose of peripheral vision and the sense of immersion. Within this region, we anticipate that comfortable eye movement unlikely occurs and head or body motion is preferred. In the case of an HMD system, a head tracker can be utilized for updating the scene rendering according to head motion without change of the relative position of the eye gaze to the display field. Therefore, eye gaze direction much less likely falls within the peripheral region. More symmetrical control points may be added to further divide the peripheral region as needed by specific applications of the proposed scheme. In general, for a foveated display composed of 3 distinct regions as described above, its relative angular resolution distribution along a given direction $\vec{r}$ may be characterized by a segmented function as $$F_{FD}(\theta_x, \theta_y) = \begin{cases} f_1(\theta_x, \theta_y) & \text{when } |\theta| \leq \theta_{C1}(\vec{r}) \\ f_2(\theta_x, \theta_y) & \text{when } \theta_{C1}(\vec{r}) \leq |\theta| \leq \theta_{C2}(\vec{r}) \\ f_3(\theta_x, \theta_y) & \text{when } |\theta| \geq \theta_{C2}(\vec{r}) \end{cases} \quad (2-1)$$

where the pixel position P on the display plane along the given direction $\vec{r}$ is specified by its field angle, $\theta$, which is defined as the angular deviation of the pixel position from the Z-axis of the OXYZ reference system in the unit of degrees and $\theta=0$ corresponds to the direction matching with the Z-axis of the OXYZ reference coordinate system. $\theta_x$ and $\theta_y$ correspond to the X-component and Y-component of the field angle $\theta$ in the horizontal and vertical directions, respectively. The X- and Y-component of the field angle, $(\theta_x, \theta_y)$, may be expressed as $\theta_x=\arctan(\cos \beta \cdot |\tan \theta|)$, and $\theta_y=\arctan(\sin \beta \cdot |\tan \theta|)$, where $\beta$ is the angular deviation of the pixel P or equivalently the direction $\vec{r}$ from the IX' axis on the display plane, and $f_1$, $f_2$, and $f_3$ are the segmented functions that characterize the relative resolution distribution within each corresponding region. One of the distinct features of the proposed scheme compared to the prior dual-resolution foveation scheme is its ability to ensure continuous change of relative resolution distribution. To ensure resolution continuity and image smoothness near the center of the display, which help to minimize transition artifacts across the center region, the function values at the first critical balance point, $\theta_{c1}(\vec{r})$, need to be equal. In the words, we shall ensure the following condition satisfied:

$$f_1(\theta)=f_2(\theta) \text{ when } |\theta|=\theta_{C1}. \quad (3-3)$$

To achieve further continuity and smoothness of the relative resolution distribution between the parafovea and peripheral region along the radial direction, the function values at the corresponding critical balance point of the regions need to be equal. We shall therefore further have the following conditions satisfied:

$$f_2(\theta)=f_3(\theta) \text{ when } |\theta|=\theta_{C2}. \quad (3-4)$$

Figure 4C:
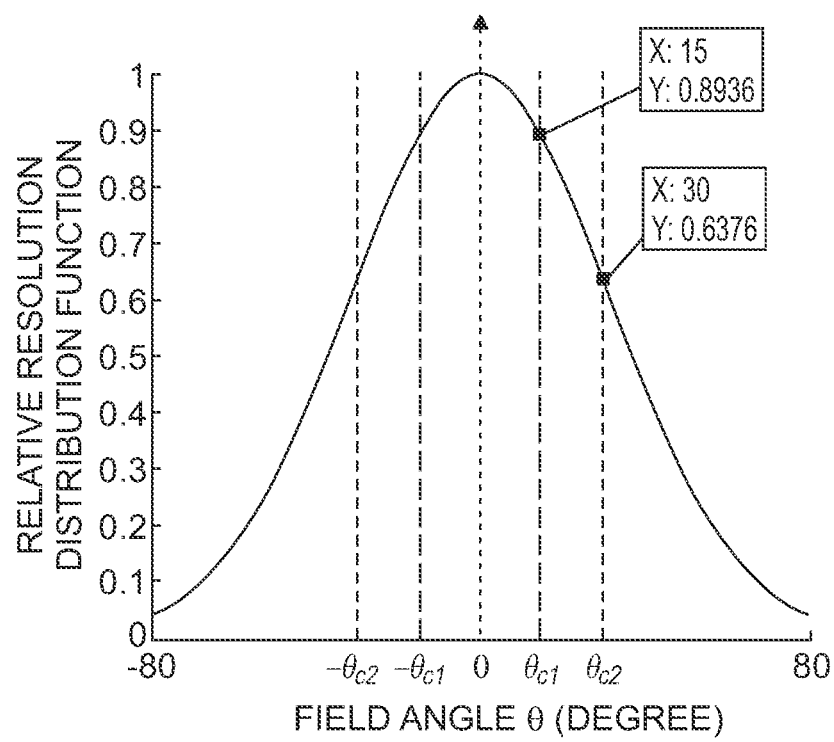
FIG. 4C illustrates an example of a relative resolution distribution in the form of a rotationally symmetric Gaussian function for a foveated display scheme.

The relative angular resolution distribution function can also be rotationally symmetric around the Z-axis. One example of the relative resolution distribution functions is shown in FIG. 4C. Here a simple Gaussian function, $F_{FD}(\theta)=e^{-0.0005\times\theta^2}$, is used to describe a rotationally symmetric foveated scheme, where $\theta$ is the field angle of a pixel P from the Z-axis, and it is also the angular distance between a given pixel P and the image center I. The values at the two critical points $\theta_{c1}=\pm 15°$ and $\theta_{c2}=\pm 30°$ are 0.89 and 0.64, respectively. The peak angular resolution of the display at the center is set to be 1 arc minutes per pixel; the angular resolution when the eye gazes towards to the directions of $15°$ and $30°$ would be 1.12 arcmins per pixel and 1.56 arcmins per pixel, respectively. Such slight degradation with eye movement probably is acceptable for many applications.

Many forms of resolution distribution functions may be utilized, some of which may offer less perceivable quality degradation or more data saving or ease of implementation. Another key aspect for implementing the proposed method is to develop metrics to evaluate the merits of different resolution distribution functions and obtain optimal function forms to meet the requirements of different applications. The choice of metrics may be driven by applications or engineering constraints. Here we propose two exemplary metrics for evaluating the merits of different function forms, one focuses on the aspect of perceived image quality variations, and the other focuses on data saving efficiency. Other metrics may also be considered for practical implementations. A perception-driven quality metrics is to find an optimal resolution distribution for a foveated display scheme such that the resulting display offers nearly imperceptible resolution degradation within the foveated region of active eye movement and small degradation within the middle region of less frequency eye movement. To achieve this goal, we characterized the perceived relative resolution of a display as a function of its field angle and eye gaze direction by factoring the visual acuity of a 20/20 standard observer and the relative resolution distribution of the display. For a given eye gaze direction, $(\phi_{Gx}, \phi_{Gy})$, the perceived resolution and acuity of a display, denoted as, $VA_{FD}$, for a given field angle $\theta$ along a given radial direction $\vec{r}$, is determined by obtaining the smaller one between the values of the relative display resolution distribution and the VA curve of the 20/20 standard observer depicted by Eq. (1) corresponding to the field angle and eye gaze direction. Generally, it can be expressed as $$VA_{FD}(\theta_x,\theta_y,\phi_{Gx},\phi_{Gy})=\min[F_{FD}(\theta_x,\theta_y),VA_{HVS}(\theta_x,\theta_y,\phi_{Gx},\phi_{Gy})]. \quad (4)$$

Figure 5:
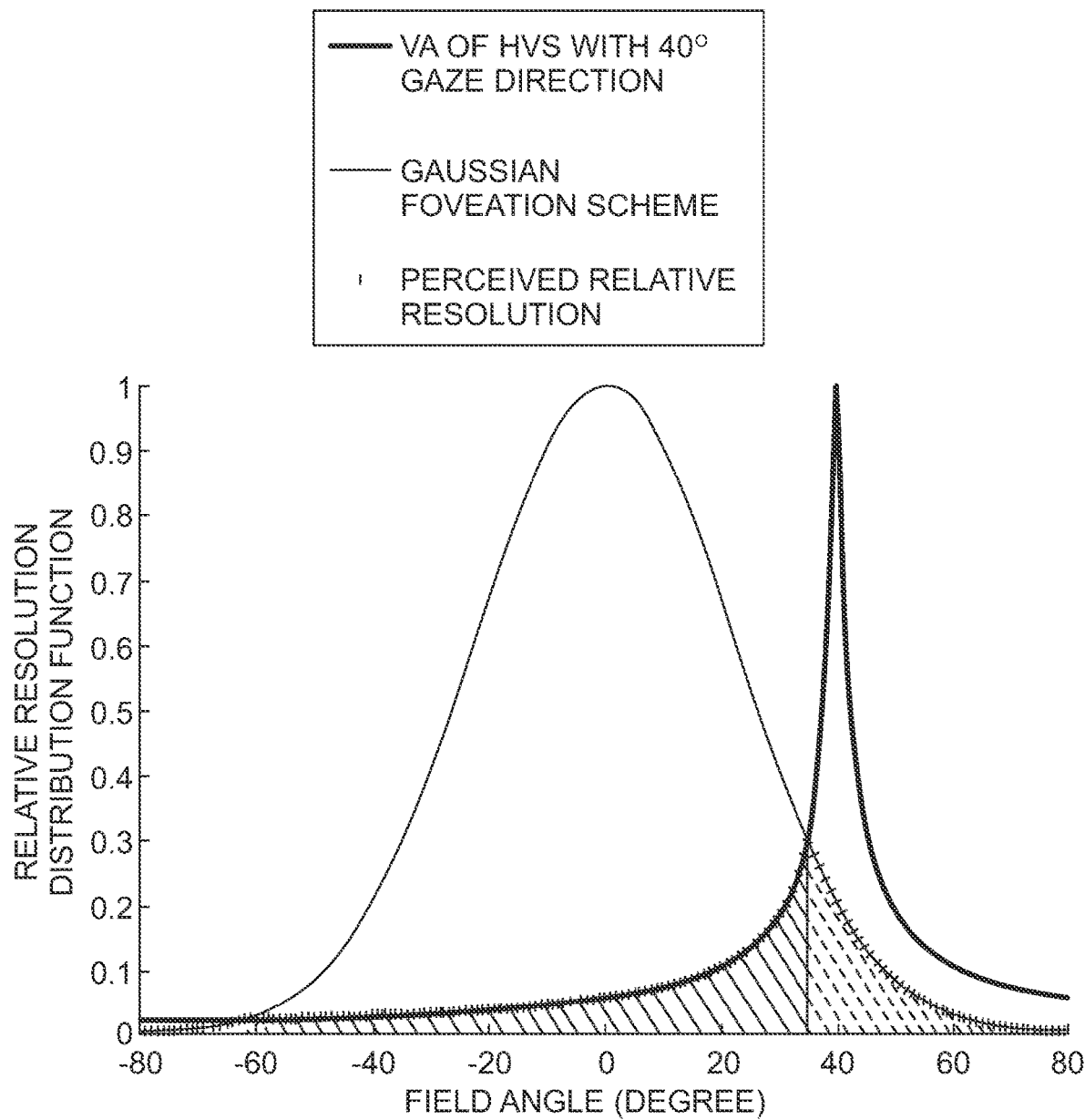
FIG. 5 illustrates perceived relative resolution of an exemplary foveated display in accordance with the present invention, with its resolution distribution function in the form of a simple Gaussian function while the eye gaze is in the direction of 40° away from the center of the display.

For conventional single-resolution displays offering a uniform angular resolution across its entire FOV that matches the fovea resolution of a 20/20 standard observer (i.e. 1 arcmin per pixel), the perceived resolution of the display for a 20/20 standard observer can be characterized as $VA_{FD}(\theta_x, \theta_y, \phi_{Gx}, \phi_{Gy})\equiv 1$. FIG. 5 illustrates an example of modeling the perceived relative resolution of a foveated display in which the relative resolution distribution is a simple Gaussian function shown in FIG. 4C, and its peak is centered on the field angle of 0 degree (i.e. the Z-axis). The eye is gazed at an angle of 40 degrees away from the center and the VA of the HVS given by Eq. (1) is plotted in the heavier solid line. The perceived VA of the display under this condition is obtained by following the steps described above in Eq. (4) and is plotted by the hash (') markers. The shaded area under the curve with the makers indicates the region where the perceived image quality is as high as the VA of the observer and the dashed-shaded area illustrates the region where the perceived image quality is worse than the VA of the observer and limited by the display. In this example, at the large eye gaze angle, the maximum perceived VA value is about 0.31, occurring at the field angle of about 34 degrees. The display outperforms on the left side of the peak and underperforms on the right side of the peak.

Further analytical metrics can be computed from the perceived resolution in Eq. (4) to evaluate the perceived performance and make comparison among different distribution functions for foveated displays. For instance, the perceived maximum resolution of the display, denoted as $VA_{FD}|_{max}$, is defined as the maximum perceived resolution across the overall display FOV at different eye gaze directions to evaluate the perceived peak performance with respect to eye motion. It is expressed as $$VA_{FD}|_{max}(\phi_{Gx},\phi_{Gy})=\max[VA_{FD}(\theta_x,\theta_y,\phi_{Gx},\phi_{Gy})]. \quad (5)$$

Clearly, an ideal foveated display with $VA_{FD}|_{max}(\phi_{Gx}, \phi_{Gy})$ equal to or approaching to 1 is highly desirable for the region with active eye movements. Similarly, we can also define a summative metric, denoted as $VR_{FD}$, to assess whether the perceived resolution of the display is below the perceptible limit of the HVS by computing the ratio of the volume enclosed by the perceived resolution curve to the volume by the VA curve of the HVS across the display FOV for different eye gaze directions. The volume ratio is defined as $$VR_{FD}(\phi_{Gx}, \phi_{Gy}) = \frac{\int_{-\theta_X/2}^{\theta_X/2}\int_{-\theta_Y/2}^{\theta_Y/2} VA_{FD}^2(\theta_x, \theta_y, \phi_{Gx}, \phi_{Gy})d\theta_x d\theta_y}{\int_{-\theta_X/2}^{\theta_X/2}\int_{-\theta_Y/2}^{\theta_Y/2} VA_{HVS}^2(\theta_x, \theta_y, \phi_{Gx}, \phi_{Gy})d\theta_x d\theta_y}. \quad (6)$$

A ratio of 1 indicates the display performs to the limit of the HVS and a ratio less than 1 indicates the display underperforms. These analytic metrics help to characterize the highest resolutions provided by display at different gaze direction and the difference between the total perceived resolution received by retina and the resolution limit rendered by the HVS.

Besides the perceived VA metrics for evaluating the perceived image quality and artifacts, the second type of metrics focuses on evaluating data saving efficiency. By adopting the analytical method described by Hua and Liu, the total amount of raw data produced by an optical system can be calculated by integrating its relative resolution distribution across all fields, which denotes the data bandwidth required by the system, and can be expressed as:

$$B=\int_{-\theta_X/2}^{\theta_X/2}\int_{-\theta_Y/2}^{\theta_Y/2} F_{FD}^2(\theta_x,\theta_y)d\theta_x d\theta_y. \quad (7)$$

Where $\theta_X$ and $\theta_Y$ are the full horizontal and vertical FOVs of the system, respectively, measured in the unit of degrees. To evaluate and compare the relative data sampling efficiency of different foveated schemes, we take the single-resolution display (SRD) as a uniform reference where the SRD offers the same resolution across its entire FOV as the peak resolution of the foveated system, i.e. $F_{SRD}(\theta_x, \theta_y)=F_{FD}(0,0)$. The relative data sampling efficiency of a foveated-resolution display (FRD) is given as:

$$S_{FRD} = \frac{B_{SRD} - B_{FRD}}{B_{SRD}}. \quad (8)$$

Design Example for Continuous Foveation Schemes

The key for implementing the proposed method described above is to optimize the choices of the critical balance points, $\theta_{C1}$ through $\theta_{CN}$, as well as the relative resolution distribution functions illustrated in Eq. (2) by accounting for the statistic characteristics of eye and head motion, the perceived resolution and acuity of the display as a function of eye motion and field angle characterized by Eqs. (4) through (6), and relative data saving efficiency by Eq. (8). By taking into account the various factors and using the metrics and constraints described above, we adjusted the general forms of the segmented functions defined in Eq. (2) to obtain relative resolution distribution functions that offer a good balance among the factors such as maximum perceived resolution, the volume ratio, data saving efficiency, and overall FOV. One preferred embodiment of a foveated display scheme in accordance with the present invention has a relative resolution distribution function that is rotationally symmetric. Such a rotationally symmetric form allows all the fields located at same radial distance from the center of the FOV have equal resolution. One preferred embodiment of such a rotationally symmetric distribution for a given field angle of $\theta$ is given as $$F_{FD}(\theta) = \begin{cases} 1 & \text{when } |\theta| \leq 10° \\ e^{-0.003(\theta-10)^2} & \text{when } 10° \leq |\theta| \leq 30° \\ \frac{2.3}{2.3+(\theta-24.68)} \cong A + B\theta^{-1} + C\theta^{-2} + D\theta^{-3} & \text{when } |\theta| \geq 30° \end{cases} \quad (9)$$

where $\theta$ is the field angle of a pixel P from the Z-axis and it is also the angular distance between a given pixel P and the image center I. $A=-0.0028$; $B=10.1602$; $C=-6.8588\times10^2$; $D=1.9659\times10^4$ and $\theta_{c1}=10°$ and $\theta_{c2}=30°$.

Figure 6A:
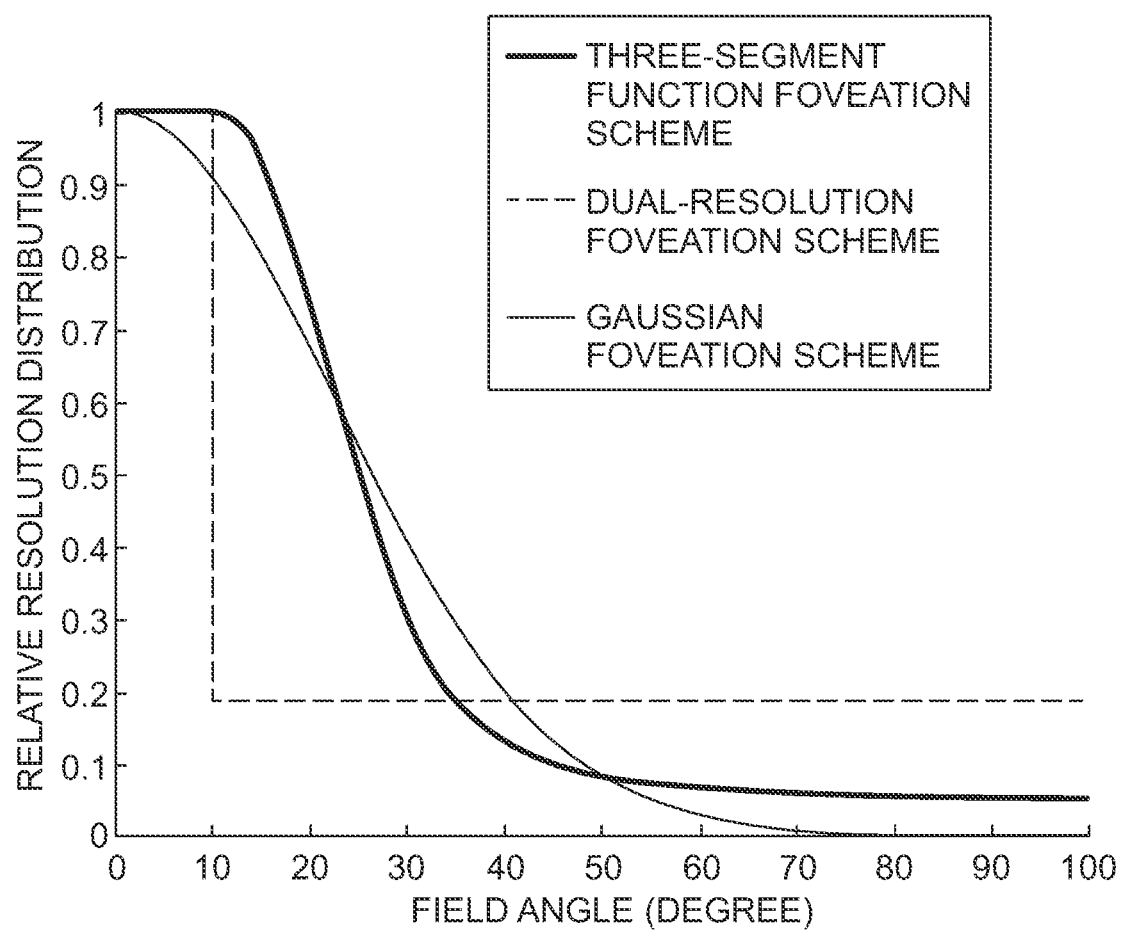
FIG. 6A illustrates a comparison of the relative resolution distribution for three different foveation schemes: three-segment function defined in Eq. (9), Gaussian distribution in FIG. 3, and a dual-resolution scheme.
Figure 6B:
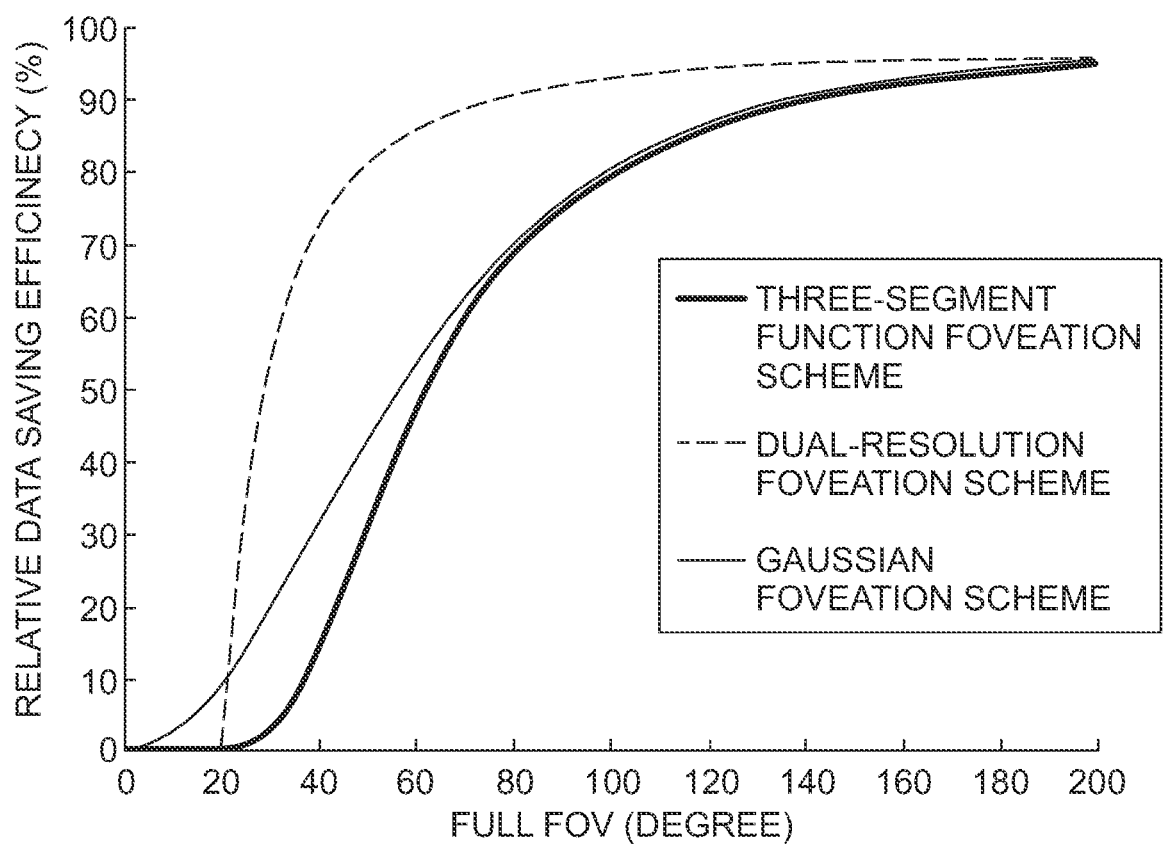
FIG. 6B illustrates a comparison of data saving efficiency of the three schemes shown in FIG. 6A as a function of the overall FOV.

In the first region of resolution distribution function, a uniform angular resolution (e.g. 1 arcmin per pixel to match the fovea visual acuity of a 20/20 standard observer) is maintained within the field angle of ±10°. For the second segment, a Gaussian function is assumed, which not only statistically predicts the possibility of eye movement but also shows the relationship that a larger rotation angle of a human eye brings a harder torque provided by muscle and skeleton. The third segment of the function uses a polynomial to fit the VA curve of the HVS when the eye gazes at 24.68-degree angle, which is determined by the value and slope of the Gaussian function at the 30-degree eccentric angle to make sure the entire function is smooth and continuous. For the purpose of comparison, FIG. 6A plots three different foveated display schemes with the corresponding resolution distributions shown in FIG. 1 for a dual-resolution scheme, FIG. 3 for a Gaussian distribution, and defined by Eq. (9). Here radial symmetry is assumed for all three schemes and thus only half of the fields were plotted. By applying Eq. (8), FIG. 6B compare the relative data sampling efficiency of these three foveation schemes shown in FIG. 6A. The foveation scheme defined in Eq. (9) yields a data saving efficiency as high as about 80% and 94.5% for displays of 100° and 200° FOV, respectively. The efficiency of this scheme comparative to that of the Gaussian function when the FOV of the system is over 70°, but slightly lower otherwise. The efficiencies of both schemes are lower than that of the dual-resolution scheme. However, as to be demonstrated below, the scheme in Eq. (9) shows considerably advantages in terms of perceived resolution over the other two schemes.

Figure 7A:
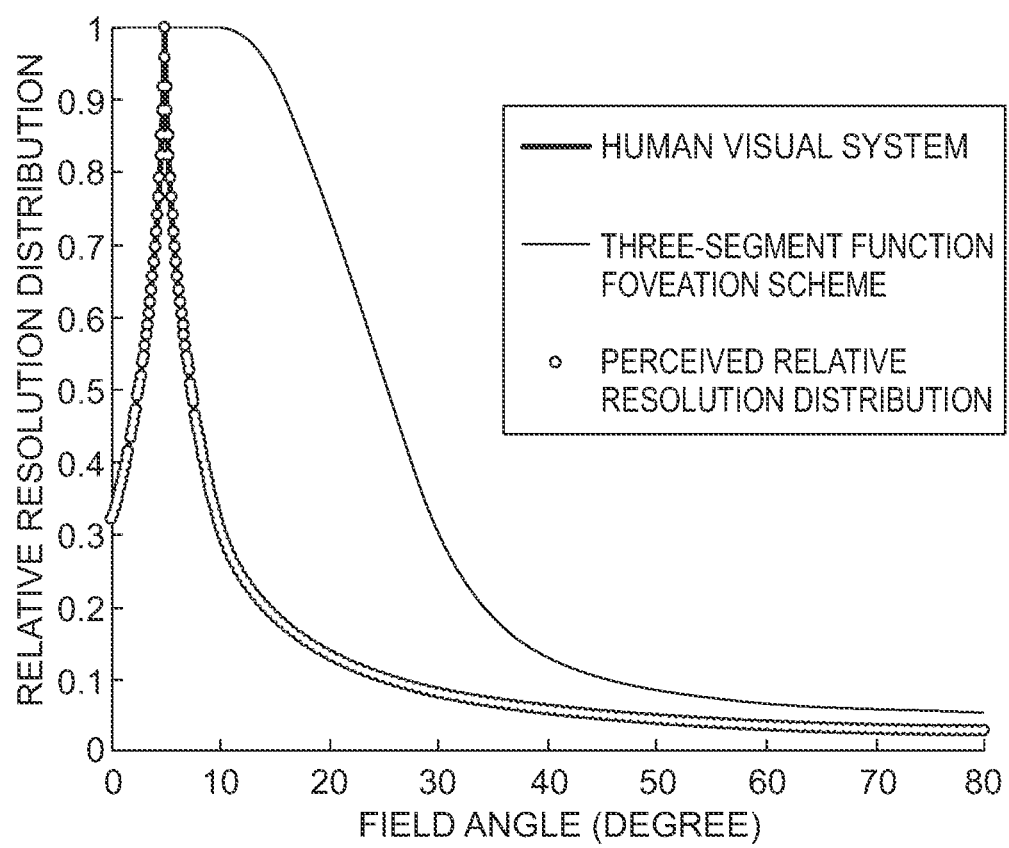
FIG. 7A-7H illustrate the perceived relative resolution distribution of the foveated display scheme defined in Eq. (9) with different eye rotation angles from 5° to 40° at a 5° interval, with FIG. 7A showing 5°, FIG. 7B showing 10°, FIG. 7C showing 15°, FIG. 7D showing 20°, FIG. 7E showing 25°, FIG. 7F showing 30°, FIG. 7G showing 35° and FIG. 7H showing 40°.
Figure 7B:
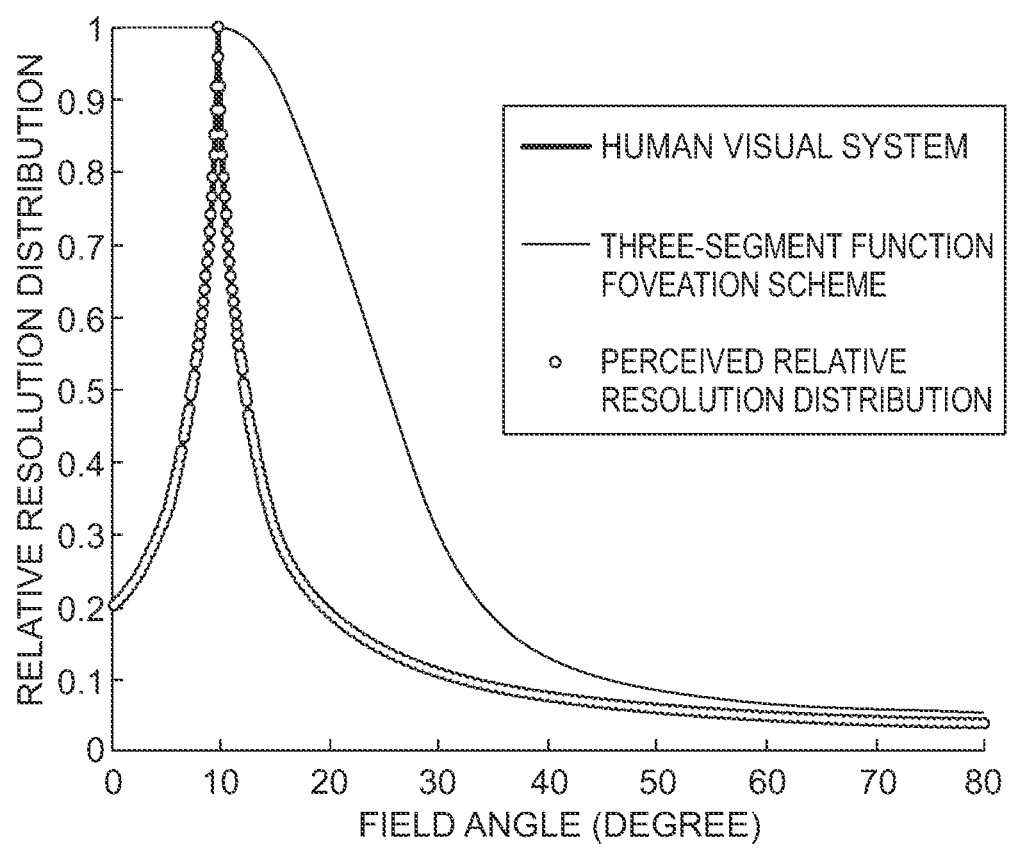
Figure 7C:
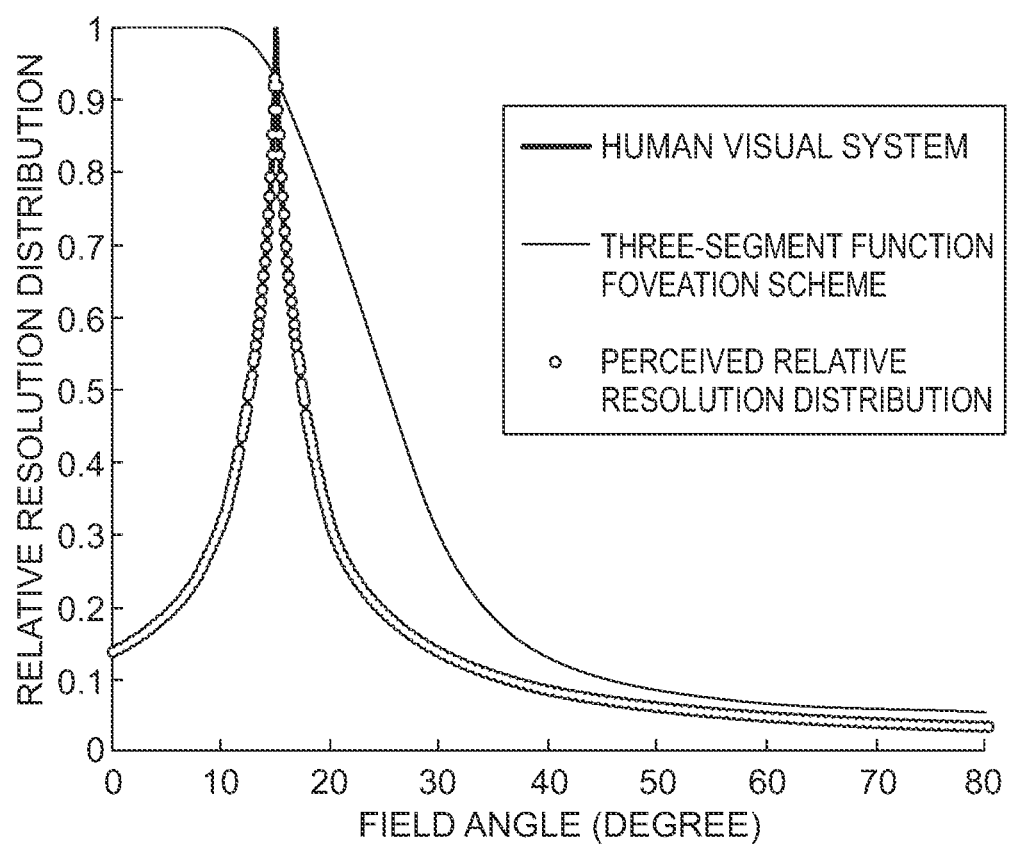
Figure 7D:
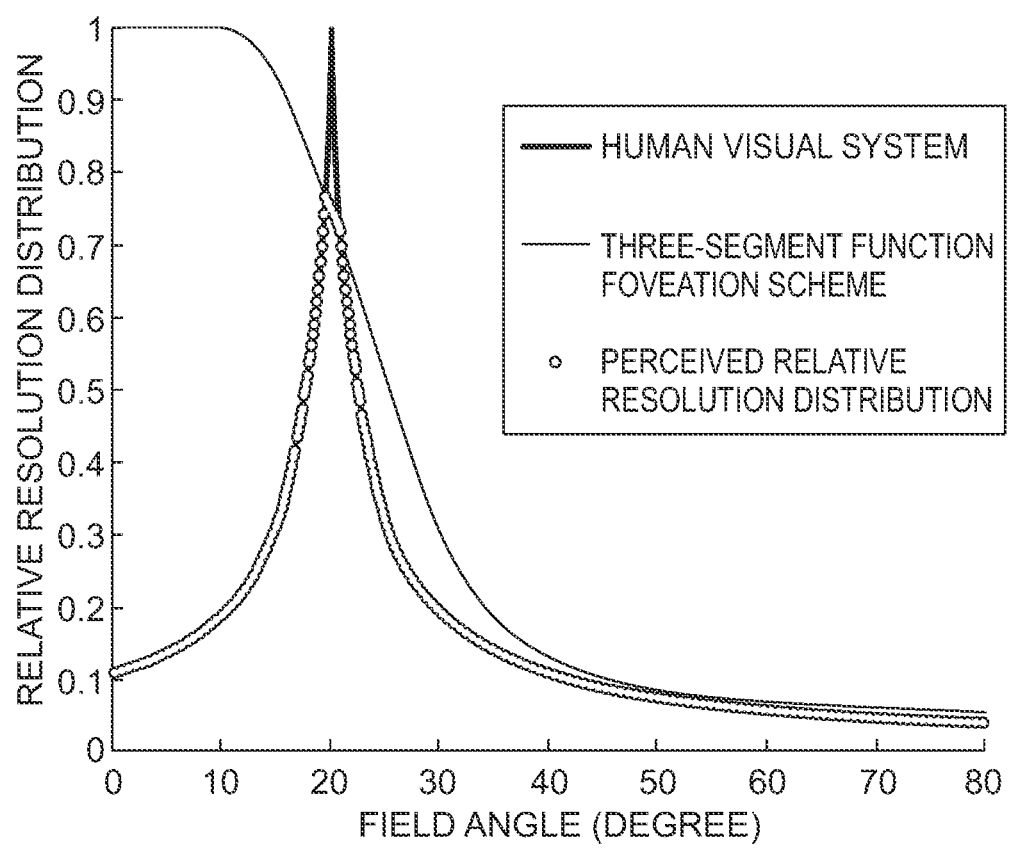
Figure 7E:
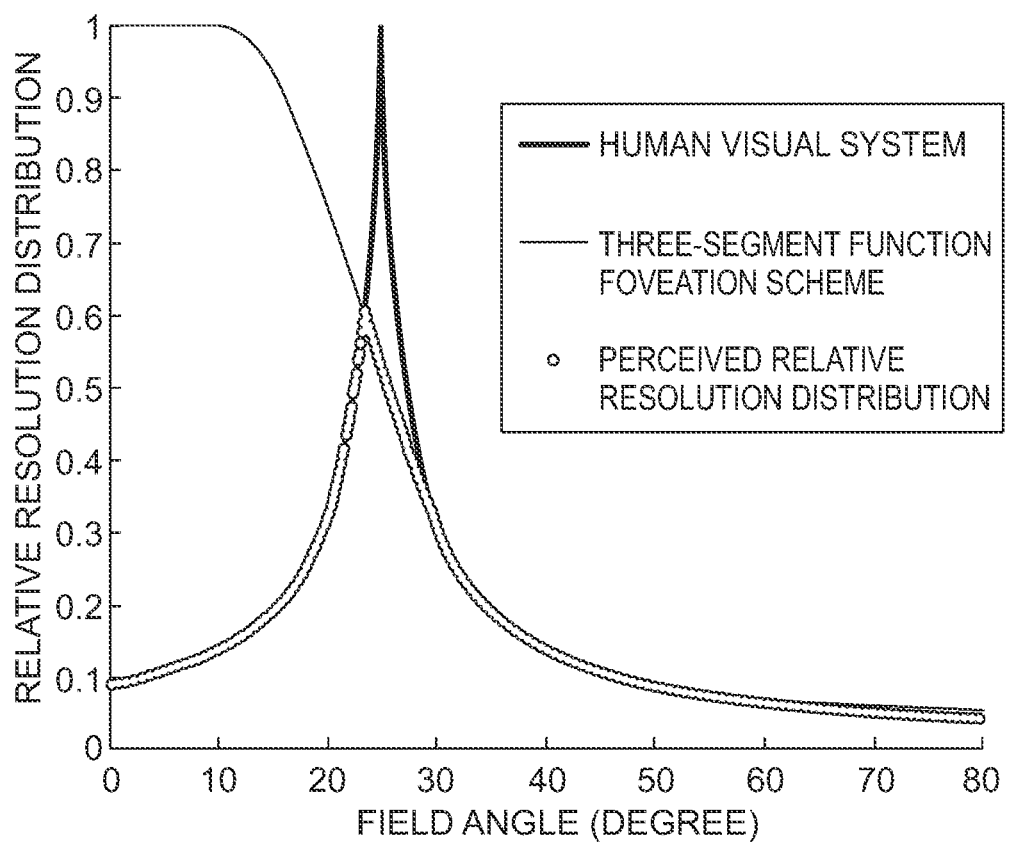
Figure 7F:
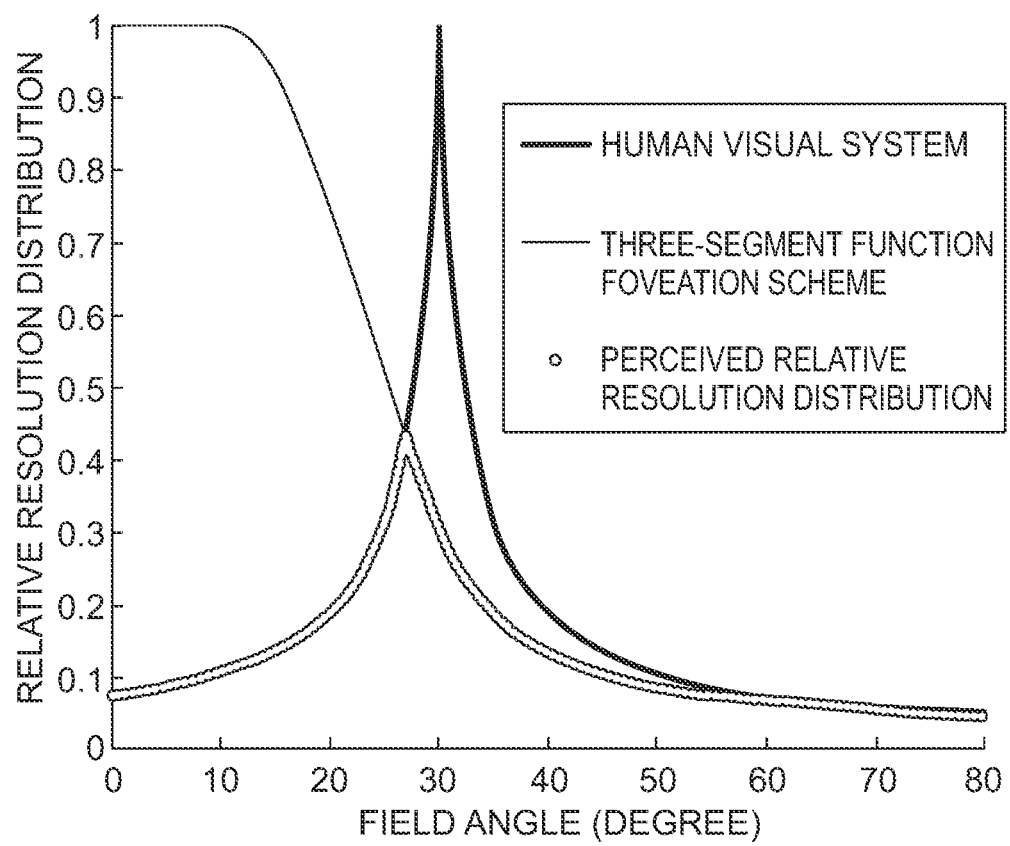
Figure 7G:
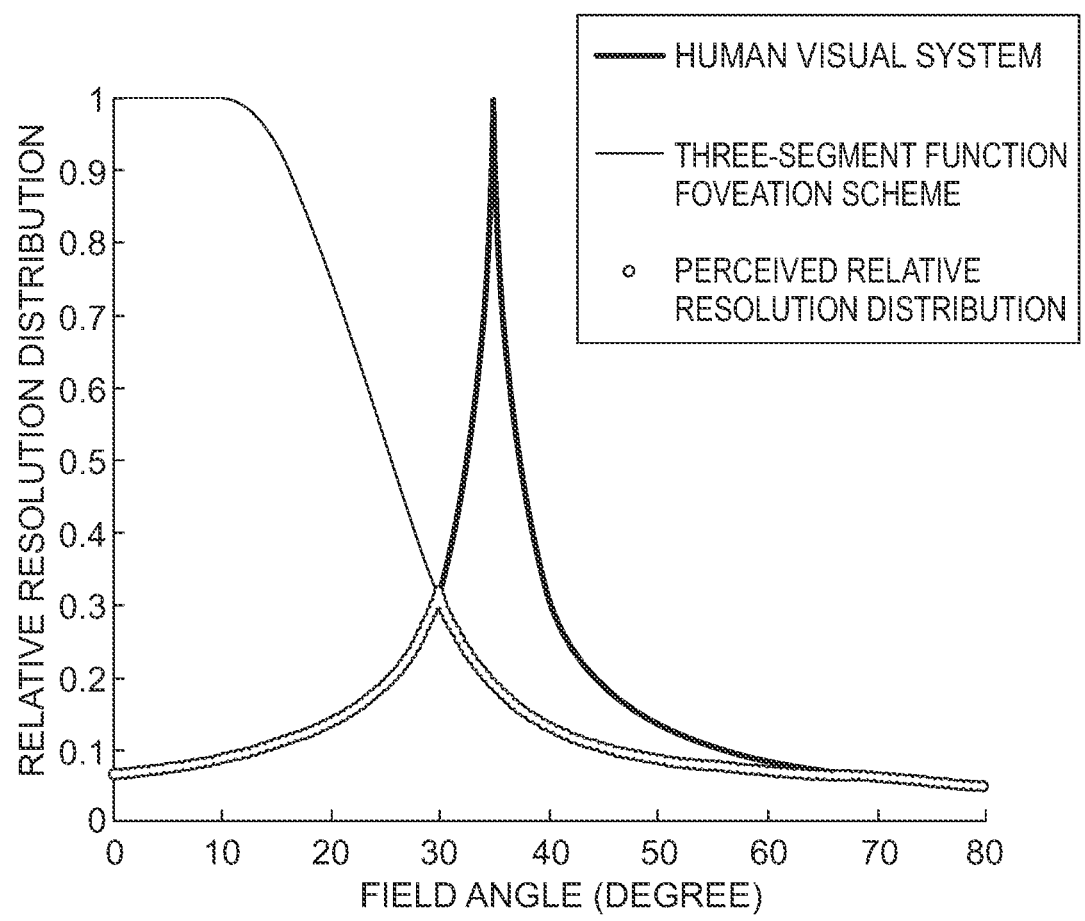
Figure 7H:
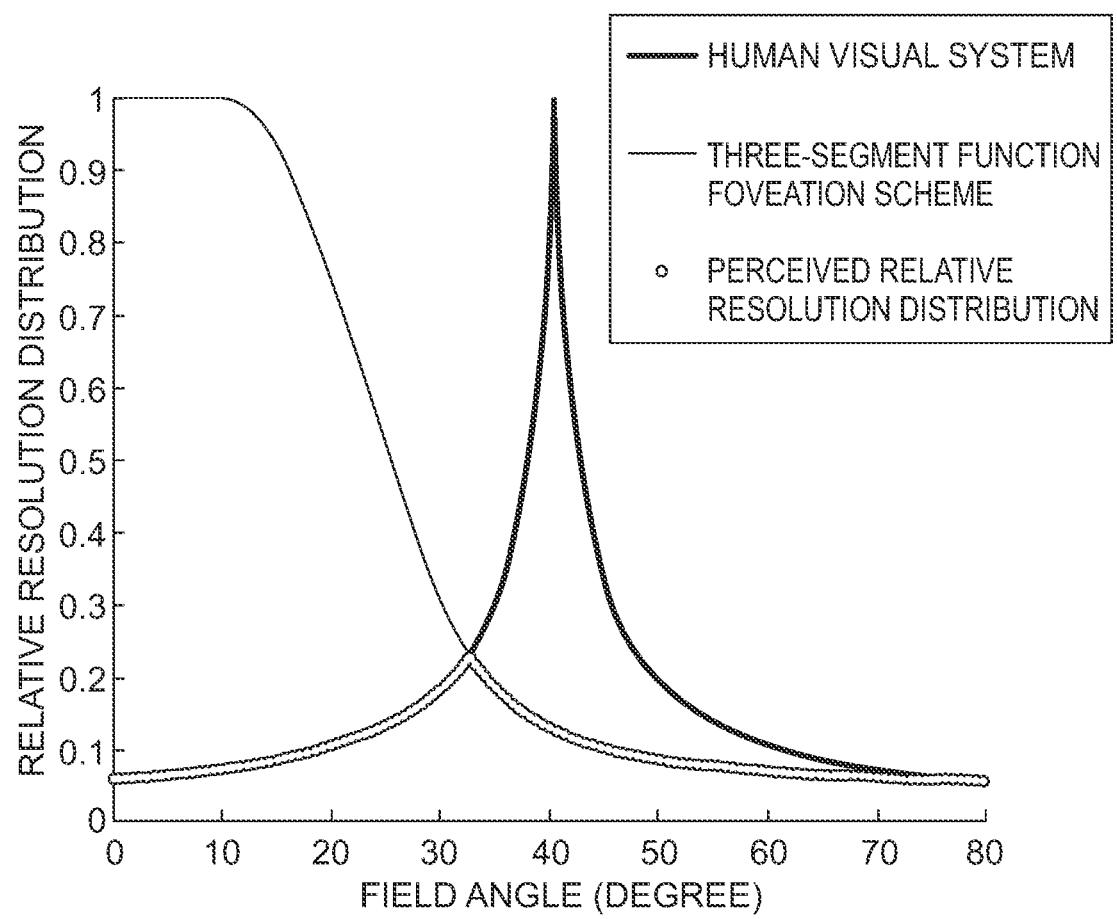

We further analyzed and compared the perceived resolution of the three different foveation schemes shown in FIG. 6A by applying the Eqs. (4)-(6). For instance, FIGS. 7A through 7H plot the perceived resolution distribution of the 3-segment distribution function defined by Eq. (9) for 8 different eye rotation angles, from 5° to 40° at an interval of 5°, respectively. Half of the display FOV from 0° to 80° is plotted. The perceived resolution function is plotted by the open circle markers while the original resolution distribution of the display and the VA curve of the HVS are plotted in thinner and relatively thicker solid lines, respectively. From these plots, it can be seen that the perceived resolution of the display is almost only subject to the limiting resolution of the HVS across the entire FOV for eye rotation angles up to ±15° within the first region from the center to 15-degree field. At 15° eye rotation angle shown in FIG. 7C, the perceived resolution around 15° field angle where the fovea center of the eye is located is about 0.95, which is slightly below the maximum VA value of a 20/20 standard observer. Therefore we can conclude that when the eye rotates within the $\pm\theta_{c1}$ (15°) region, there is no perceivable resolution degradation across the entire FOV of the foveated display based on this foveation scheme. When the eye rotates toward the middle region within $\pm(\theta_{C1}=15°, \theta_{C2}=30°)$, which corresponds to FIGS. 7C-7F, the perceived resolution of the display degrades gradually for field angles near the fovea center of the eye, with peak values decreasing from about 0.95 to 0.45. Such degradation with a medium rate still provides good enough perceived quality. For instance, the maximum perceived resolution drops to about 59% of the peak resolution when the eye gazes at a 25° angle, shown in FIG. 7E, and the maximally perceived resolution also shifts by about 3 degrees from the fovea center. Even when the eye is rotated by a 30° angle, as shown by FIG. 7F, the maximally perceived resolution drops to about 45% of the peak resolution, corresponding to 2.2 arcmins/pixel.

Figure 8A:
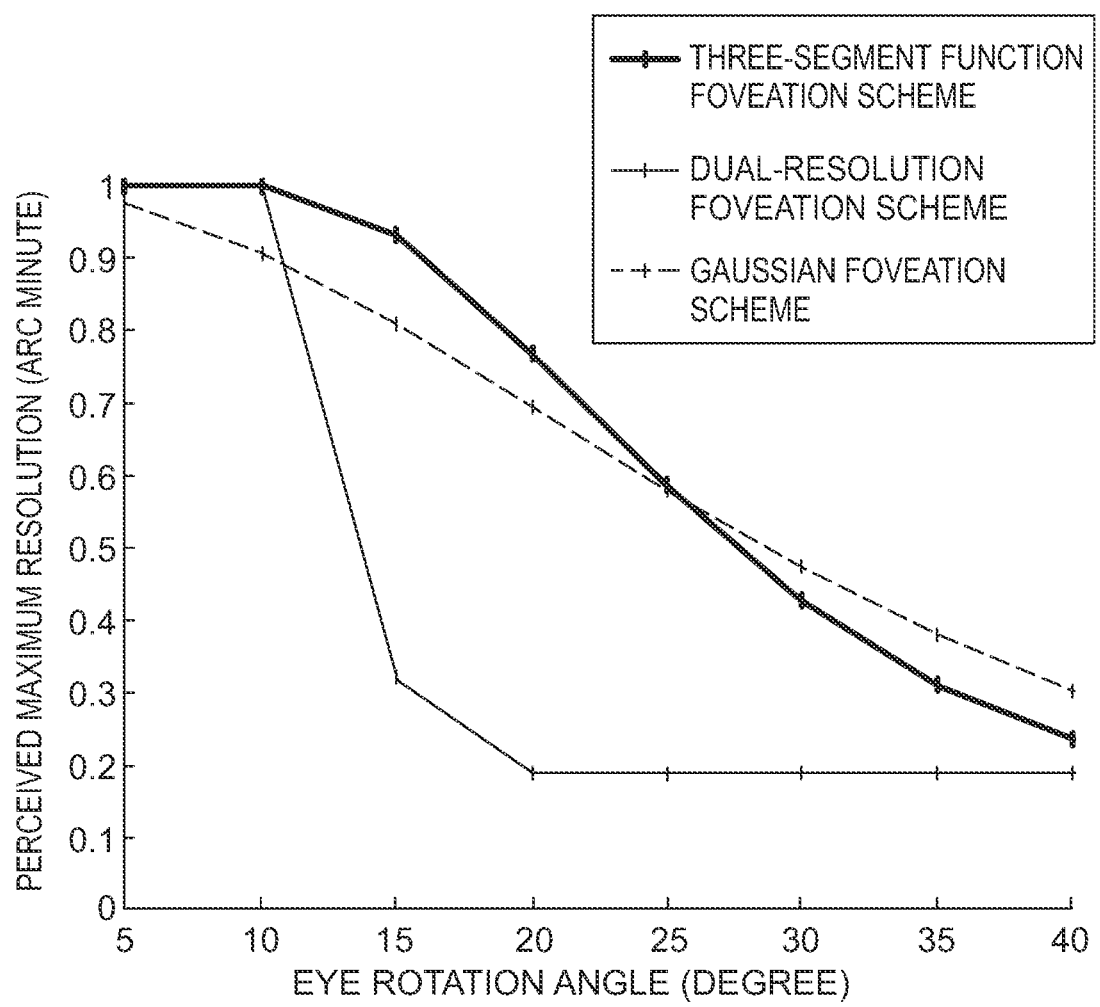
FIG. 8A illustrates a comparison of maximum value of perceived VA as a function of eye rotation angle between an exemplary display in accordance with the present invention and a dual-resolution display.
Figure 8B:
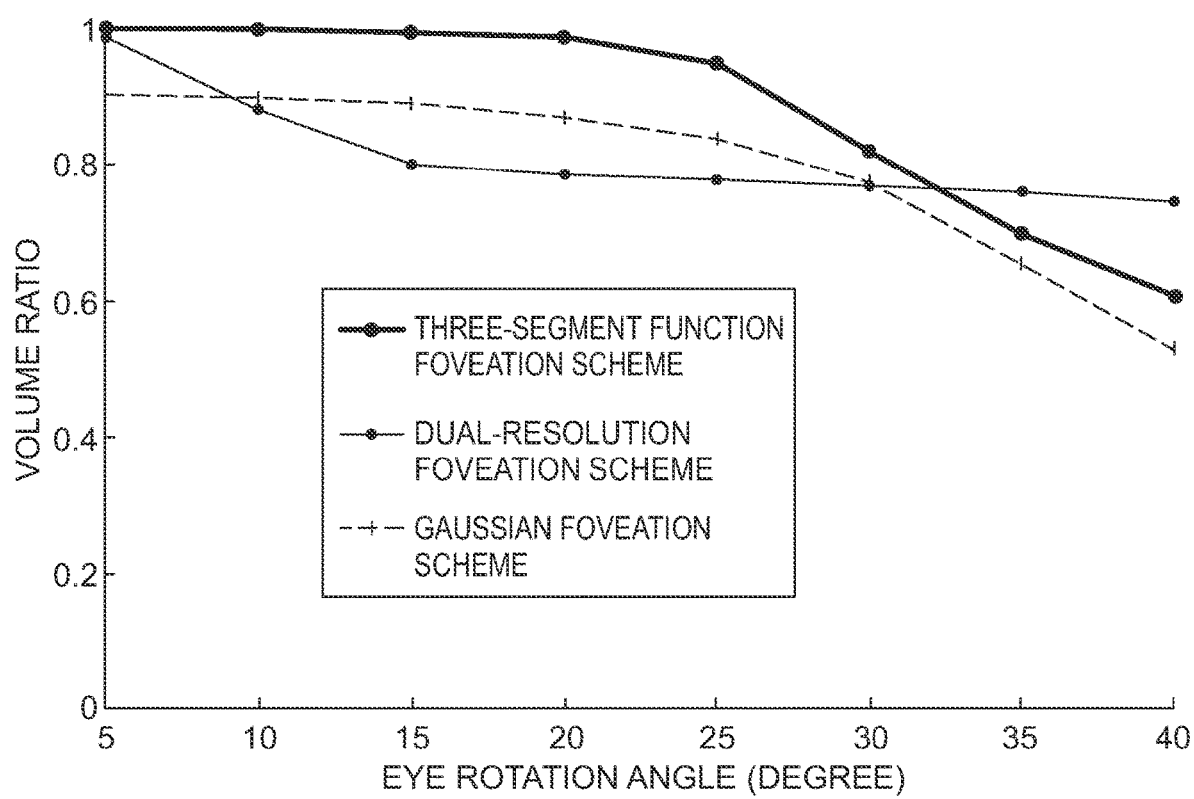
FIG. 8B illustrates a comparison of the volume ratio of perceived VA's area to human VA's area as a function of eye rotation angle between an exemplary display in accordance with the present invention and dual-resolution display.

Applying Eq. (5) and (6), FIGS. 8A and 8B compares the maximally perceived resolution and volume ratio of the three different foveation schemes, respectively, as a function of the eye rotation angles. As a comparison, the maximally perceived resolution drops below 30% of the peak resolution only at 15° eye rotation for the dual-resolution foveated display, while the 3-segment foveation scheme maintains a value as high as 0.95 at the same eye rotation angle and about 45% at 30-degree eye rotation angle. Between the Gaussian and 3-segment foveation schemes, the maximally perceived resolution for the 3-segment foveation scheme is noticeably higher for eye rotation angles up to 25 degrees. In terms of the volume ratio, the 3-segment foveation scheme is above 95% for eye rotations up to 20 degrees, which indicates nearly no perceivable degradation within this range of eye motion, and its ratio is noticeably higher than those of the other two schemes for eye rotation up to 30 degrees. Overall, we can conclude that the perceived performance of the 3-segment foveation scheme, when properly optimized, is adequate without implementing dynamic foveation, and degrades more gracefully than the other two schemes, especially within the area eye movement occurring most frequently.

It is worth noting that the relative resolution distribution function defined in Eq. (9) is only one exemplary embodiment of many different forms of the foveation functions that can be derived based on the general methods described. The function as described in Eq. (2) can be extended with more than 3 segments with more than 2 critical balance points on each side of the reference center, and it does not have to be rotationally symmetric.

Optical Embodiments to Continuously Foveated Displays

There are many different ways to implement a continuously foveated display based on the methods described in Section 2. As mentioned earlier, a continuously foveated display may be implemented as a foveated direct-view display or as a foveated head-mounted display. FIG. 9 schematically illustrates a foveated direct-view display system 100 having a display 110. The display surface 102 is made of pixels 101 arranged in such a way that the pixel size, s, and pixel pitch, p, varies spatially across the display surface 102. Here the pixel size is defined as the dimension of a pixel 101 while the pitch is the center-to-center separation between adjacent pixels 101. Clearly a key difference of such a display system 100 is that in conventional displays pixels of the same size are typically uniformly arranged on regular grids or other regular patterns with the same pitch between neighboring pixels across the entire display surface. For simplicity, here we assume the pixel size s and pitch p at a given spatial location $P(\theta_x, \theta_y)$ are approximately the same, i.e. the pixels 101 have a nearly 100% fill factor, leaving no gap between adjacent pixels 101. In reality, the pixel size can be different from the pixel pitch if the pixel size is smaller or bigger than the pixel pitch. A key to implementing such a spatially varying pixel arrangement is to determine the pixel pitch distribution as a function of the field position P on the display surface 102. For the purpose of generality without depending on the distance between a viewer and the display pixel arrangement, here we define the angular pixel pitch, $p_a(\theta_x, \theta_y)$, as the center-to-center angular separation between adjacent pixels 101 measured in the unit of arc minutes. To achieve a desired resolution for a given field position $P(\theta_x, \theta_y)$ to the viewer, the angular pixel pitch, $p_a(\theta_x, \theta_y)$, is given by $$p_a(\theta_x, \theta_y) = \frac{\tan\left(\frac{p_{a0}}{F_{FD}(\theta_x, \theta_y)}\right)}{\cos^2\theta}, \quad (10)$$

where $F_{FD}(\theta_x, \theta_y)$ is the desired relative resolution distribution function, and $p_{a0}$ is the angular pixel pitch at the origin I of the display surface 102 in the unit of arc minutes. The field position P on the display plane along the given direction $\vec{r}$ is specified by its field angle, $\theta$, which is defined as the angular deviation of the pixel position from the Z-axis of the OXYZ reference system in the unit of degrees and θ=0 corresponds to the direction matching with the Z-axis of the OXYZ reference coordinate system. $\theta_x$ and $\theta_y$ corresponds to the X-component and Y-component of the field angle θ in the horizontal and vertical directions, respectively. The X- and Y-component of the field angle, $(\theta_x, \theta_y)$, may be expressed as $\theta_x$=arctan(cos β·|tan θ|), and $\theta_y$=arctan (sin β·|tan θ|), where β is the angular deviation of the pixel P or equivalently the direction $\vec{r}$ from the IX' axis on the display plane. Consider that display surface 102 is located at a distance L (mm) away from the viewer, the geometrical pixel pitch, $p_g$, measured in the unit of mm on the display plane, can be calculated as $$p_g(x, y) = \frac{L}{\cos^2 \theta} \tan\left(\frac{\arctan\left(\frac{p_{g0}}{L}\right)}{F_{FD}(\theta_x, \theta_y)}\right), \quad (11)$$

where $$\theta = \arctan\left(\frac{\sqrt{x^2+y^2}}{L}\right), \beta = \arctan\left(\frac{y}{x}\right),$$

here x and y are the coordinates of the pixel P on the display plane IX'Y' and $p_{g0}$ is the pixel pitch at the origin I of the display surface.

Such a spatially varying display surface 102 can be implemented by several different display technologies based on raster scanning where the scanning intervals can be controlled or programmed in order to create spatially varying pixel distributions defined in Eqs. (10) and (11). For instance, a laser scanning display method that has been developed for the projector and television industry (en.wikipedia.org/wiki/Laser_video_display) can be adapted for the implementation of a foveated display system 100 shown in FIG. 9. One or multiple laser beams of different colors to produce a combined color spot may be scanned and projected in a raster pattern or in spiral pattern across the display plane, controlled by a computer, such that the pitch between adjacent beam locations and beam footprint size increases following the geometrical or angular pixel pitch defined in Eq. (10) and (11), as the beams deviate from the center of the field toward the edge field of the display 110. This method can be implemented either as a static foveation system where the peak of the resolution distribution function is always centered with the reference center I. Alternatively, it can be implemented as a dynamic foveation system where the peak of the resolution distribution function is shifted to be centered with the eye gaze direction of the observer, which require an additional device to track eye gaze direction, and additional control to adapt the pixel distribution to the eye gaze direction.

Figure 10A:
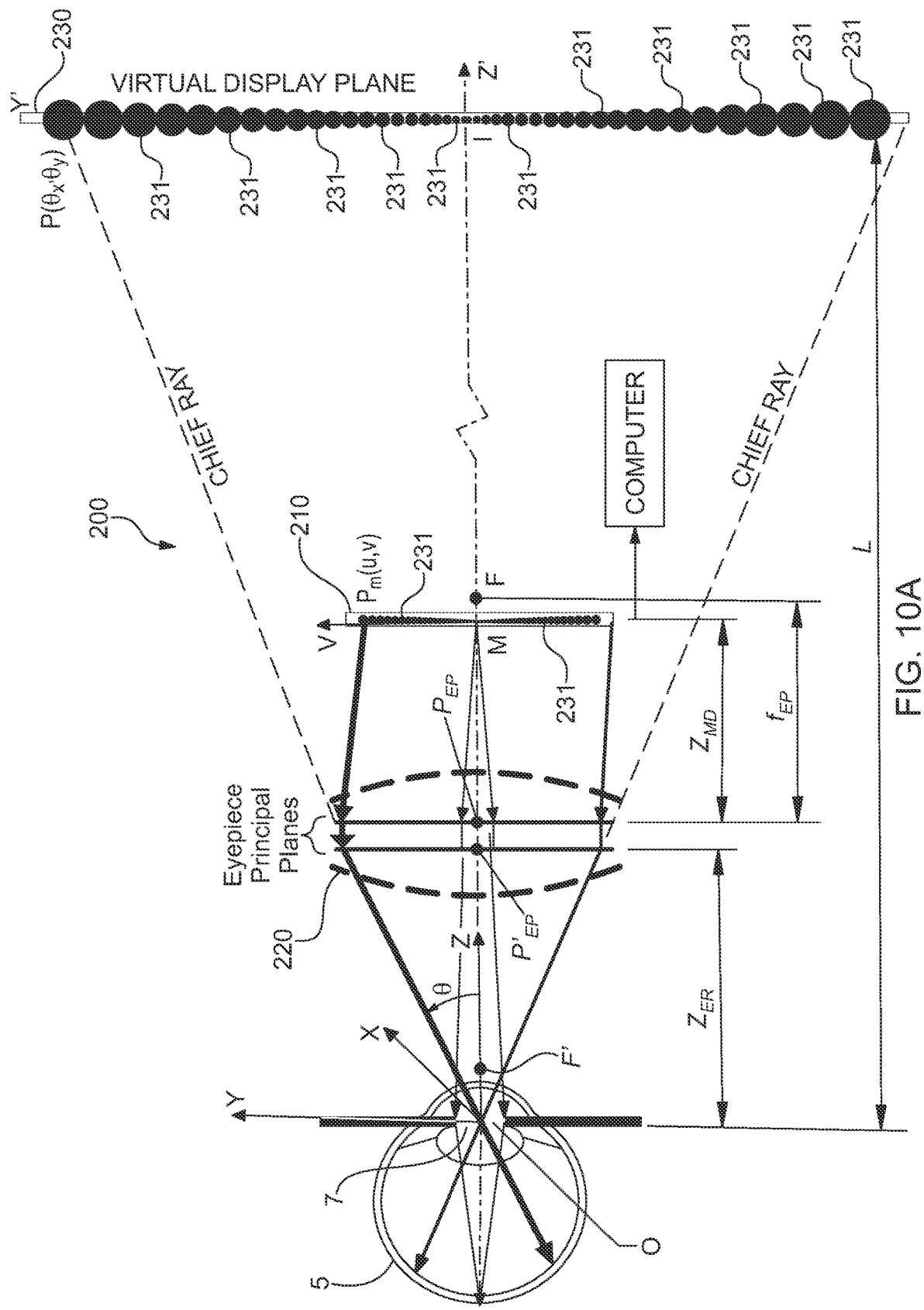
FIG. 10A schematically illustrates an exemplary configuration of a foveated head-mounted display in accordance with the present invention.

The schematic layout for a direct-view foveated display 200 in accordance with the present invention can be adapted to a foveated head-mounted display (FHMD). FIG. 10A shows the schematic layout of a FHMD design which comprises a conventional eyepiece optics 220 inserted between the eye 5 and a microdisplay source 210 with a spatially-varying pixel pitch. The conventional eyepiece optics 220 has a focal length of $f_{EP}$ and the microdisplay source 210 is placed at a distance of $z_{MD}$ from the rear principal plane, $P_{EP}$, of the eyepiece 220. The entrance pupil of the eye 7 is located at a distance $z_{ER}$ away front the front principal plane, $P'_{EP}$, of the eyepiece 220. Through the eyepiece 220, the viewer sees the virtual image of the display source 210, labeled as the virtual display plane in FIG. 10A, is approximately located at L distance away from the viewer, where $$L = \frac{f_{EP} \cdot z_{MD}}{f_{EP} - z_{MD}} + z_{ER}.$$

Figure 10B:
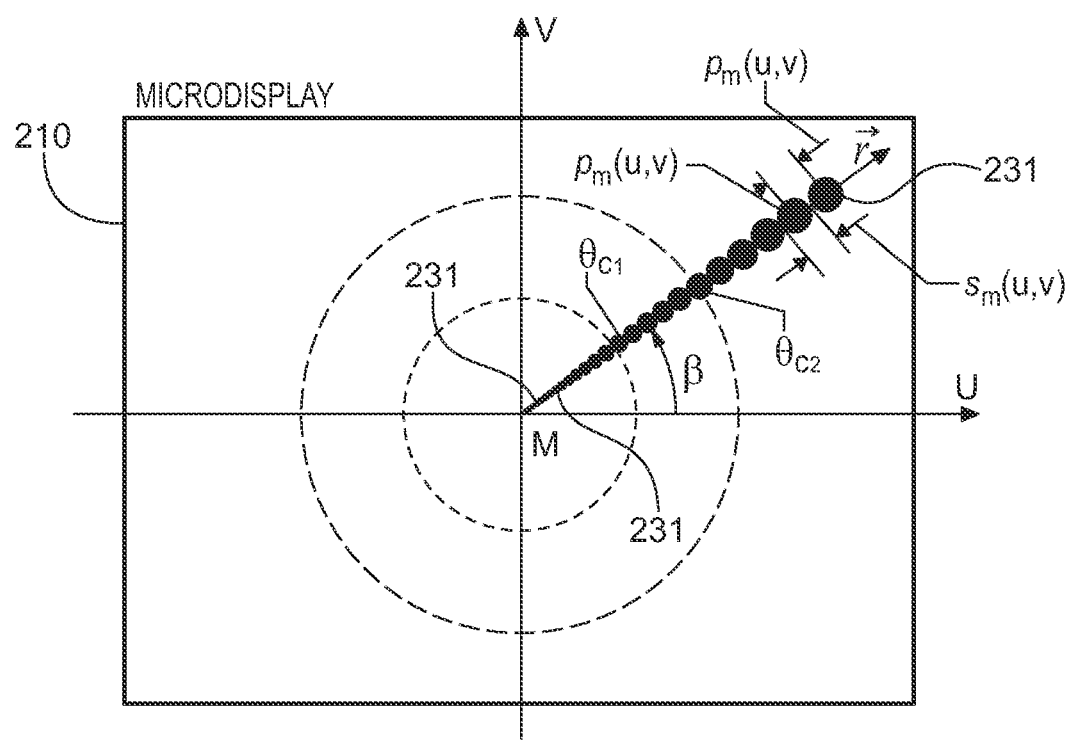
FIG. 10B schematically illustrates an exemplary configuration of a miniature display source with spatially varying pixel pitch in accordance with the present invention, such as that used in FIG. 10A.

FIG. 10B illustrates the non-uniformly arranged pixels on the microdisplay along a given direction $\vec{r}$. Imaged through the eyepiece optics 220, a pixel on the microdisplay 210 is magnified and projected onto a corresponding virtual pixel 231 on the virtual display plane 230. For convenience, we define a reference coordinate system OXYZ in the visual space, where the origin O is located at the center of the entrance pupil 7 of the eye, Z axis is along the corresponding LoS when the eye gaze direction is parallel to the direction of head pose (in other words, no eye movements are engaged in both horizontal and vertical directions and the eye is gazing naturally straight forward), the OXY plane is perpendicular to Z-axis, and the Y axis is pointing upward. In an HMD system, the Z-axis typically also coincides with the optical axis of the eyepiece 220. We further define a secondary reference coordinate system IX'Y'Z' on the virtual display plane 230 which is viewed by the eye 5. The origin I is the intersection of the Z-axis of the OXYZ reference with the virtual display plane 230, and the X'-, Y', and Z' axes are parallel to the X-, Y, and Z-axes, respectively. The display plane IXY is displaced from the OXY plane by a distance L along the Z-axis. Finally, we define a reference coordinate system MUVW on the microdisplay plane. The origin M is the intersection of the Z-axis of the OXYZ reference with the microdisplay plane, and the U-, V, and W axes are parallel to the X-, Y, and Z-axes, respectively. Consider a given virtual pixel, $P(\theta_x, \theta_y)$, along a given radial direction $\vec{r}$ on the virtual display plane 230. The position of the virtual pixel, P, may be characterized by the corresponding field angle, θ, with respect to the eye reference OXYZ, which is defined as the angular distance of the virtual pixel position, P, from the reference center I or equivalently the angular deviation from the Z-axis of the OXYZ reference system. θ=0 corresponds to the direction matching with the Z-axis of the OXYZ reference coordinate system. $\theta_x$ and $\theta_y$ corresponds to the X-component and Y-component of the field angle θ in the horizontal and vertical directions, respectively. For this virtual pixel P, its mapped pixel location, $P_m(u,v)$, on the microdisplay is given by $$\begin{cases} u = \frac{(m_0 \cdot z_{MD} + z_{ER}) \tan \theta_x}{m_0} \\ v = \frac{(m_0 \cdot z_{MD} + z_{ER}) \tan \theta_y}{m_0} \end{cases} \quad (13)$$

where $m_0$ is the optical magnification of the eyepiece, given as $$m_0 = \frac{f_{EP}}{f_{EP} - z_{MD}},$$

u and v are the coordinates of the pixel on the microdisplay coordinate system MUVW. Let us consider that the desired relative resolution distribution function on the virtual display plane 230 to be $F_{FD}(\theta_x, \theta_y)$, the angular and geometrical pixel pitches, $p_a(\theta_x, \theta_y)$ and $p_g(\theta_x, \theta_y)$, on the virtual display plane 230 can be derived in the similar fashion by Eq. (10) and (11), respectively. The key to implementing such a FHMD shown in FIG. 10A is to determine the requirement for pixel pitch distribution on the microdisplay 210 so that this special image source can be made accordingly. Based on the mapping between the virtual display plane 230 and microdisplay 210 given in Eq. (13), the corresponding geometrical pixel pitch, $p_m$, on the microdisplay 210, measured in the unit of mm, can be calculated as $$p_m(u, v) = \frac{L}{m_0 \cos^2\left(\arctan\left(\frac{m_0\sqrt{u^2+v^2}}{L}\right)\right)} \tan\left(\frac{\arctan\left(\frac{m_0 p_{m0}}{L}\right)}{F_{FD}\left(\arctan\left(\frac{m_0 u}{L}\right), \arctan\left(\frac{m_0 u}{L}\right)\right)}\right) \quad (14)$$

where $p_{m0}$ is the pixel pitch at the origin M of the microdisplay source 210 210, $m_0$ is the optical magnification of the eyepiece 220, given as $$m_0 = \frac{f_{EP}}{f_{EP} - z_{MD}},$$

$f_{EP}$ is the focal length of the eyepiece 220, $z_{MD}$ is the distance from the rear principal plane, $P_{EP}$, of the eyepiece 220 to the microdisplay source 210, and $z_{ER}$ is the distance from the front principal plane, $P'_{EP}$, of the eyepiece 220 to the entrance pupil 7 of the eye 5 (or the exit pupil of the eyepiece 220). u and v are the coordinates of the pixel on the microdisplay coordinate system MUVW, and $F_{FD}(\theta_x, \theta_y)$ is the desired relative resolution distribution function on the virtual display plane 230. Such a spatially varying microdisplay source 210 can be implemented by several different display technologies based on raster scanning where the scanning intervals can be controlled or programmed in order to create spatially varying pixel distributions defined in Eqs. (14). For instance, a miniature laser scanning display by MicroVision Inc. can be adapted for the implementation of a foveated HMD system shown in FIG. 10A. One or multiple laser beams may be scanned in a raster pattern or in spiral pattern, controlled by a computer, such that the pitch between adjacent beam locations and beam footprint size increases following the pixel pitch defined in Eq. (14), as the beams deviate from the center of the field toward the edge field of the display. This method can be implemented either as a static foveation system where the peak of the resolution distribution function is always centered with the reference center I. Alternatively, it can be implemented as a dynamic foveation system where the peak of the resolution distribution function is shifted to be centered with the eye gaze direction of the observer, with an additional device to track eye gaze direction, and additional control to adapt the pixel distribution to the eye gaze direction.

Although the proposed foveated display can be implemented with a display source 210 that can produce spatially varying pixel arrangement, only very few display technologies provide this potential ability to create spatially varying pixel arrangement prescribed by a desired foveation scheme. Most of the state-of-art display technologies, such as liquid crystal (LC) based technology, or digital mirror devices (DMD), are array based technologies where the pixels are arranged in a regular array with a uniform pitch, and they are more readily available and low-cost.

Figure 11A:
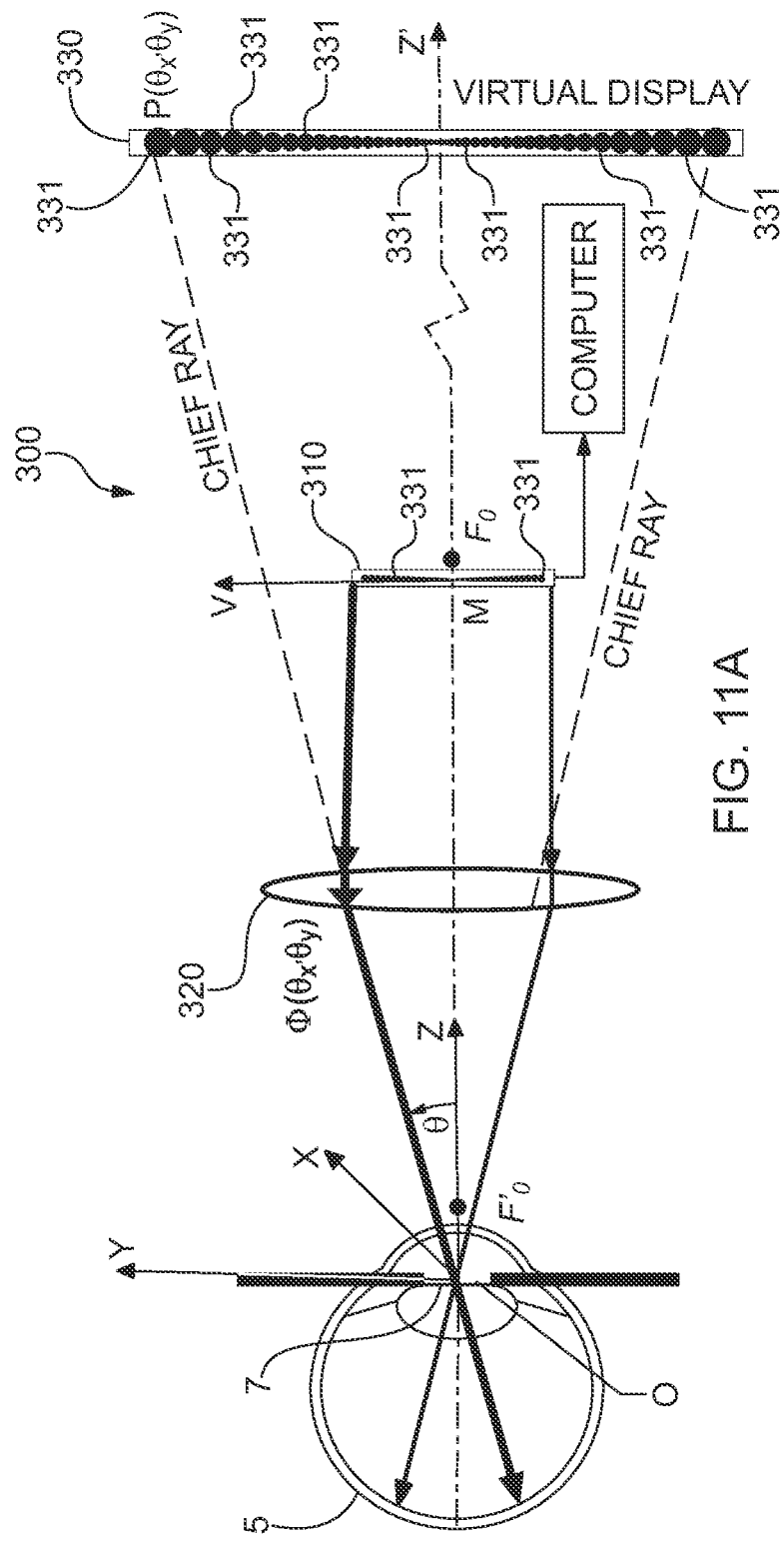
FIG. 11A schematically illustrates an exemplary configuration of a foveated head-mounted display in accordance with the present invention comprising an eyepiece with spatially varying optical power and a microdisplay with a uniform pixel pitch.

Instead of requiring the use of specially made miniature display source 310 as shown in the FIG. 10B where the pixel pitch is spatially varied in a manner prescribed by Eq. (11), FIG. 11A shows a schematic layout of a statically foveated head-mounted display 300 comprising an eyepiece optics 320 with spatially varying optical power and an ordinary microdisplay source 310. For convenience, we define a reference coordinate system OXYZ in the visual space, where the origin O is located at the center of the entrance pupil 7 of the eye 5, Z axis is along the corresponding LoS when the eye gaze direction is parallel to the direction of head pose (in other words, no eye movements are engaged in both horizontal and vertical directions and the eye is gazing naturally straight forward), the OXY plane is perpendicular to Z-axis, and the Y axis is pointing upward. In an HMD system, the Z-axis typically also coincides with the optical axis of the eyepiece 320. We further define a secondary reference coordinate system IX'Y'Z' on the virtual display plane 330 which is viewed by the eye 5. The origin I is the intersection of the Z-axis of the OXYZ reference with the virtual display plane 330, and the X'-, Y', and Z' axes are parallel to the X-, Y-, and Z-axes, respectively. The display plane IXY is displaced from the OXY plane by a distance L along the Z-axis. Finally, we define a reference coordinate system MUVW on the microdisplay plane. The origin M is the intersection of the Z-axis of the OXYZ reference with the microdisplay plane, and the U-, V, and W axes are parallel to the X-, Y, and Z-axes, respectively.

Figure 11B:
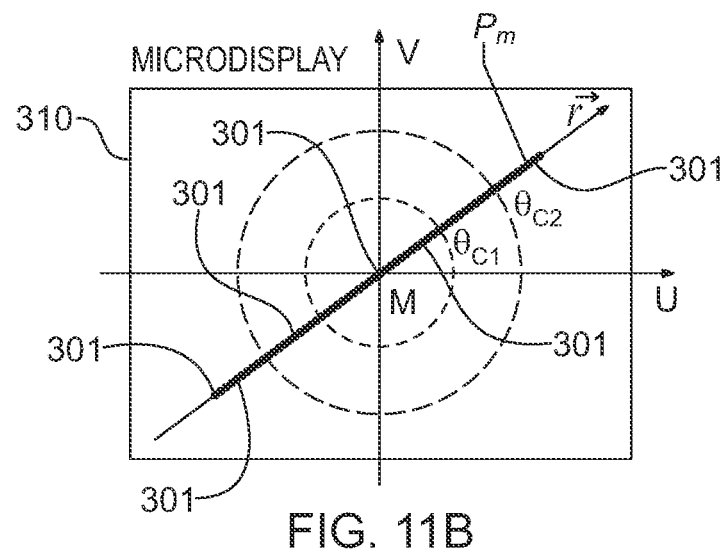
FIG. 11B schematically illustrates an exemplary configuration of the pixel distribution of the microdisplay of FIG. 11A.
Figure 11C:
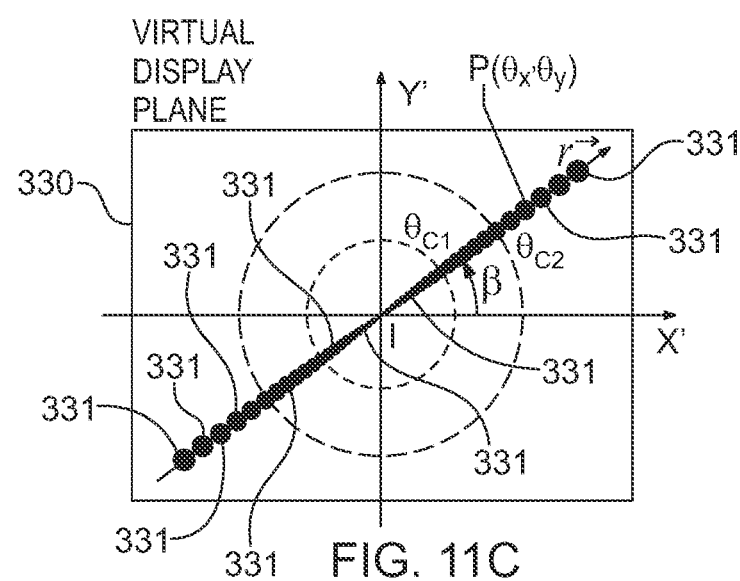
FIG. 11C schematically illustrates an exemplary configuration of the pixel distribution of the virtual display plane of FIG. 11A.

Consider a given virtual pixel, $P(\theta_x, \theta_y)$, along a given radial direction $\vec{r}$ on the virtual display plane 330. The position of the virtual pixel, P, may be characterized by the corresponding field angle, θ, with respect to the eye reference OXYZ, which is defined as the angular distance of the virtual pixel position, P, from the reference center I or equivalently the angular deviation from the Z-axis of the OXYZ reference system. θ=0 corresponds to the direction matching with the Z-axis of the OXYZ reference coordinate system. $\theta_x$ and $\theta_y$ corresponds to the X-component and Y-component of the field angle θ in the horizontal and vertical directions, respectively. The pixels 301 of the microdisplay source 310, as illustrated in FIG. 11B, are arranged in a uniform array format with a constant pixel pitch in both horizontal and vertical directions. Such microdisplays are readily available from many vendors. Examples include but not limited to liquid crystal displays (LCD), liquid crystal on silicon (LCoS) devices, DMD devices, organic light emitting displays (OLED), and many others. The eyepiece optics 320, instead of having a fixed focal length or optical power like a conventional eyepiece, is designed to have spatially varying optical magnification or optical power, $\Phi(\theta_x, \theta_y)$, where $(\theta_x, \theta_y)$ is the field angles in horizontal and vertical directions in the visual space. The eyepiece optics 320 magnifies the uniformly-spaced pixels 301 on the microdisplay 310 to create a virtual display plane 330 seen by the viewer that appears to have a spatially varying distribution of pixels 331, as illustrated in FIG. 11C, which approximates a desired resolution distribution function. Let us consider the microdisplay 310 has a uniform pixel pitch $p_{m0}$ (mm) and the desired resolution distribution function in the visual space as $F_{FD}$. The optical power for a given field angle $\theta(\theta_x, \theta_y)$, where the optical power is the reciprocal of the focal length of an optics, is expressed as $$\Phi(\theta_x, \theta_y) = \frac{1}{P_{m0}\cos^2(\arctan(\sqrt{\tan^2\theta_x + \tan^2\theta_y}))} \tan\left(\frac{\arctan(\Phi_0 p_{m0})}{F_{FD}(\theta_x, \theta_y)}\right), \quad (15)$$

where $\Phi_0$ is the optical power for the center field $\theta=0$, and is expressed as $$\Phi_0 = \frac{\tan(p_{a0})}{p_{m0}},$$

$p_{a0}$ is the desired angular resolution in arcminutes for the central field of the virtual display, and $p_{m0}$ is the pixel pitch on the microdisplay. $\theta_x$ and $\theta_y$ corresponds to the X-component and Y-component of the field angle $\theta$ in the horizontal and vertical directions, respectively, and $F_{FD}(\theta_x, \theta_y)$ is the desired relative resolution distribution function on the virtual display plane. For simplicity, we can further define a relative magnification distribution function, which is defined as the ratio of the optical power of a given field angle to that of the central field, expressed as $$m(\theta_x, \theta_y) = \frac{\Phi(\theta_x, \theta_y)}{\Phi_0}. \quad (16)$$

This method is preferably implemented as a static foveation system where the peak of the resolution distribution function is always centered with the reference center I. As demonstrated in above, when the desired resolution distribution function in the visual space as $F_{FD}$ is properly optimized, the perceived resolution of the display only degrades minutely if any within the region of active eye movements and degrades elegantly within the region with only occasional eye engagement.

Figure 12:
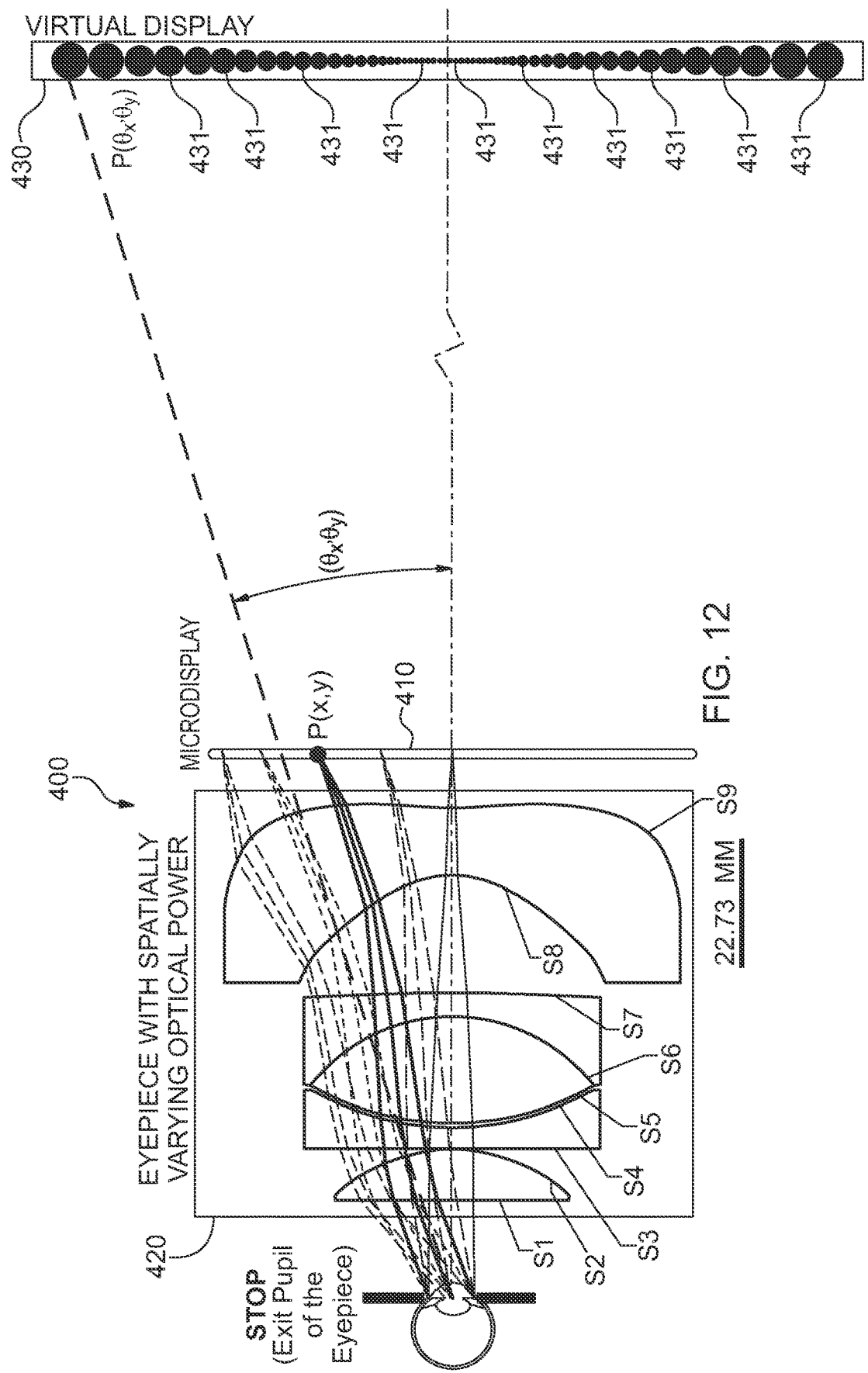
FIG. 12 schematically illustrates an exemplary configuration of an optical layout of a foveated head-mounted display design comprising an eyepiece with spatially varying optical power and a microdisplay with a uniform pixel pitch in accordance with the present invention.
Figure 13A:
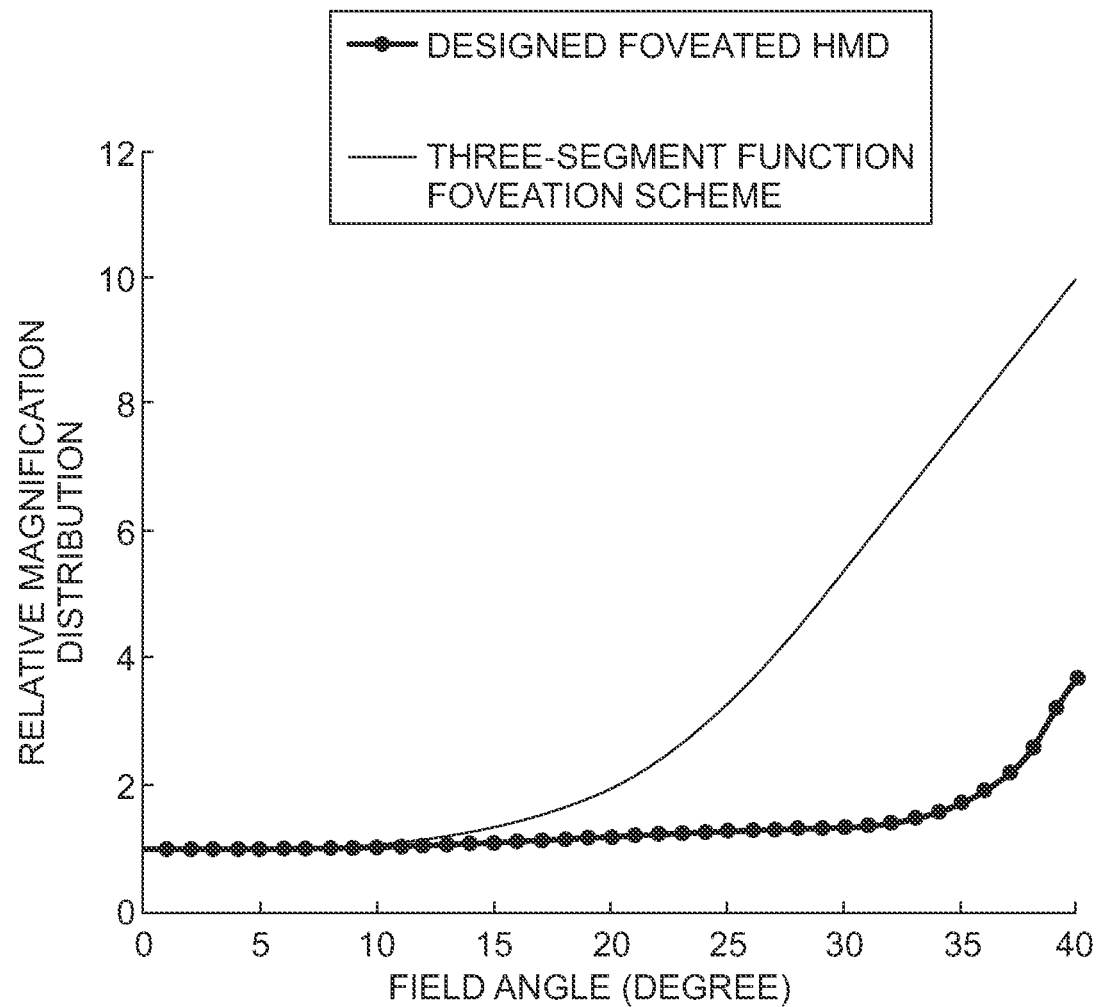
FIG. 13A illustrates relative magnification distribution as a function of field angles of the design of FIG. 12.
Figure 13B:
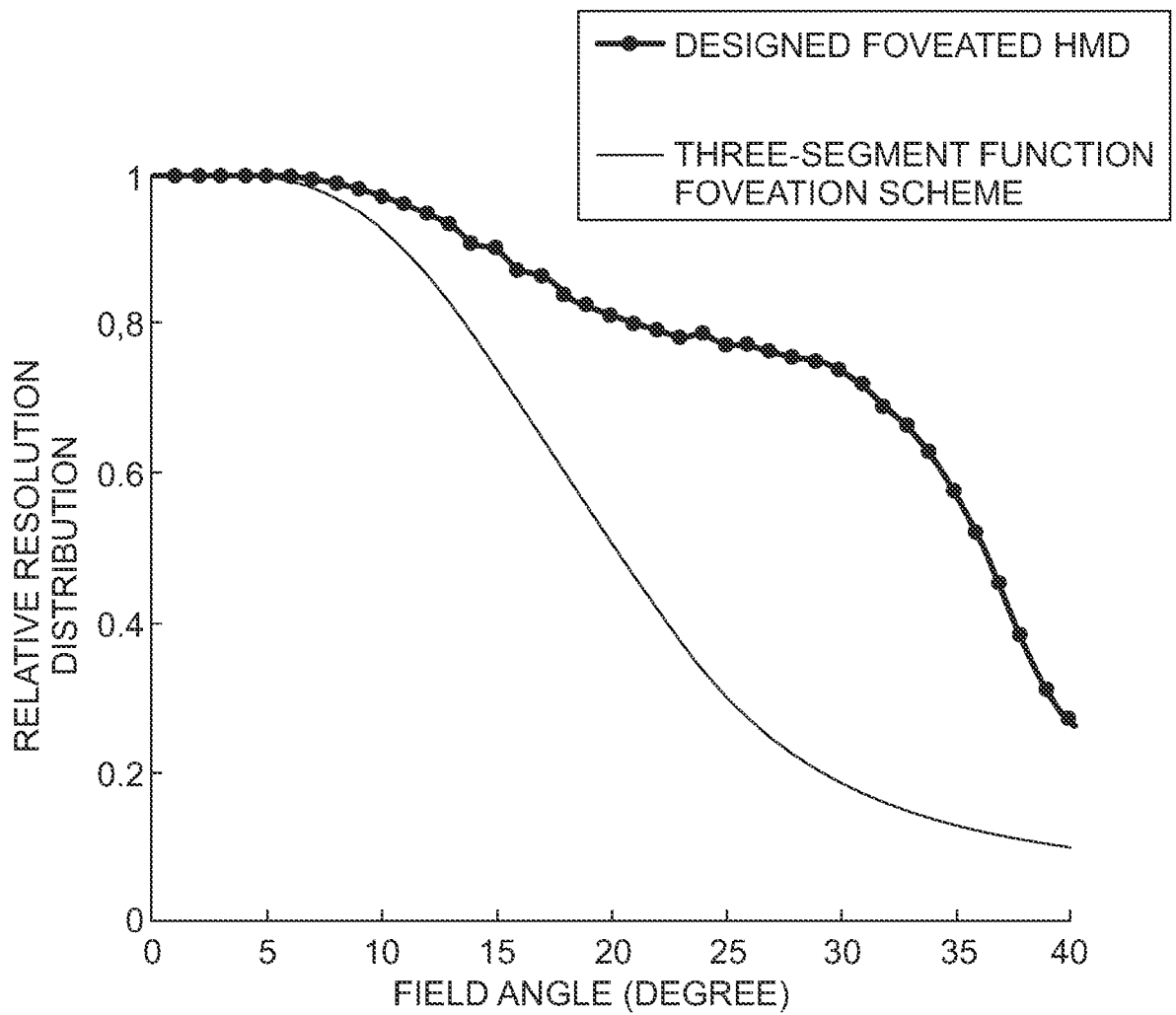
FIG. 13B illustrates plots of the relative resolution distribution function in the visual space of the design of FIG. 12.

FIG. 12 shows the optical layout of a static foveated HMD design 400 based on the scheme shown in FIG. 11A. The design mainly comprises an eyepiece 420 with spatially varying optical power and a microdisplay 410 with regular pixel pitch. In this design, the microdisplay is an LCD display with a total of 2540 pixels in the diagonal direction, with a pixel pitch of 33 μm. The eyepiece design comprises four optical elements for which the optical prescriptions are summarized in Table 1. Three of the elements are off-the shelf optics available through Edmund Optics, while the last element, comprising surfaces S8 and S9, is a custom-designed optics comprising two aspherical surfaces. The aspherical coefficients of the two surfaces S8, S9 are listed in Table 2. The full FOV of the system is 80 degrees. FIG. 13A plots the relative magnification distribution, $m(\theta_x, \theta_y)$ as a function of field angles while FIG. 13B plots the relative resolution distribution function, $F_{FD}(\theta_x, \theta_y)$, on the virtual display 430 with pixels 431 seen by a viewer in the visual space for both the design shown in FIG. 12 (line with dot markers) and the desired 3-segment foveation scheme described in Eq. (9) (in thinner line without markers). From the center of the field of view to the ±40° edge fields, the relative optical magnification, $$m(\theta_x, \theta_y) = \frac{\Phi(\theta_x, \theta_y)}{\Phi_0},$$

of the eyepiece, equivalently the optical power, $\Phi(\theta_x, \theta_y)$, monotonically increases by about 4 times as shown in FIG. 13A, while the back focal distance of the eyepiece maintained a constant. With a constant pixel pitch on the microdisplay 410, the relative angular resolution of the virtual display 430 image reduces by about 4 times from the value of 1 at the center field and to about 0.25 at the ±40°. In the meantime, the relative angular resolution of the virtual display 430 is higher than 0.75 for field angles up to ±30°.

TABLE 1

Optical surface prescription of the eyepiece design shown in FIG. 12

| Surface Num. | Surface Type | Radius | Thickness | Material |
|---|---|---|---|---|
| Object | | Infinity | Infinity | |
| Stop | | Infinity | 18 | |
| S1 | Sphere | Infinity | 9.31 | NBK7 |
| S2 | Sphere | −31.03 | 0.1 | |
| S3 | Sphere | Infinity | 4 | NBK7 |
| S4 | Sphere | 51.5 | 0.1 | |
| S5 | Sphere | 51.88 | 20 | NBAF10 |
| S6 | Sphere | −32.79 | 4.5 | SF10 |
| S7 | Sphere | −309.45 | 21.501799 | |
| S8 | Asphere | −20.261039 | 12.281994 | PMMA |
| S9 | Asphere | 111.206508 | 9.366949 | |
| Image | | | | |

TABLE 2

Aspherical coefficients for the surfaces S8 and S9 of the eyepiece design shown in FIG. 12

| Parameter | Surface 8 | Surface 9 |
|---|---|---|
| Y Radius (R) | −20.26103943 | 111.20650840 |
| Conic Constant (k) | −0.50200021 | −36.55525701 |
| 4th-order Coefficient (A) | 8.19668027e−006 | −3.37952689e−006 |
| 6th-order Coefficient (B) | 5.42668346e−009 | −1.11635600e−008 |
| 8th-order Coefficient (C) | 1.78601819e−011 | 1.54186620e−011 |
| 10th-order Coefficient (D) | −8.38642508e−015 | −5.96525291e−015 |

Figure 14A:
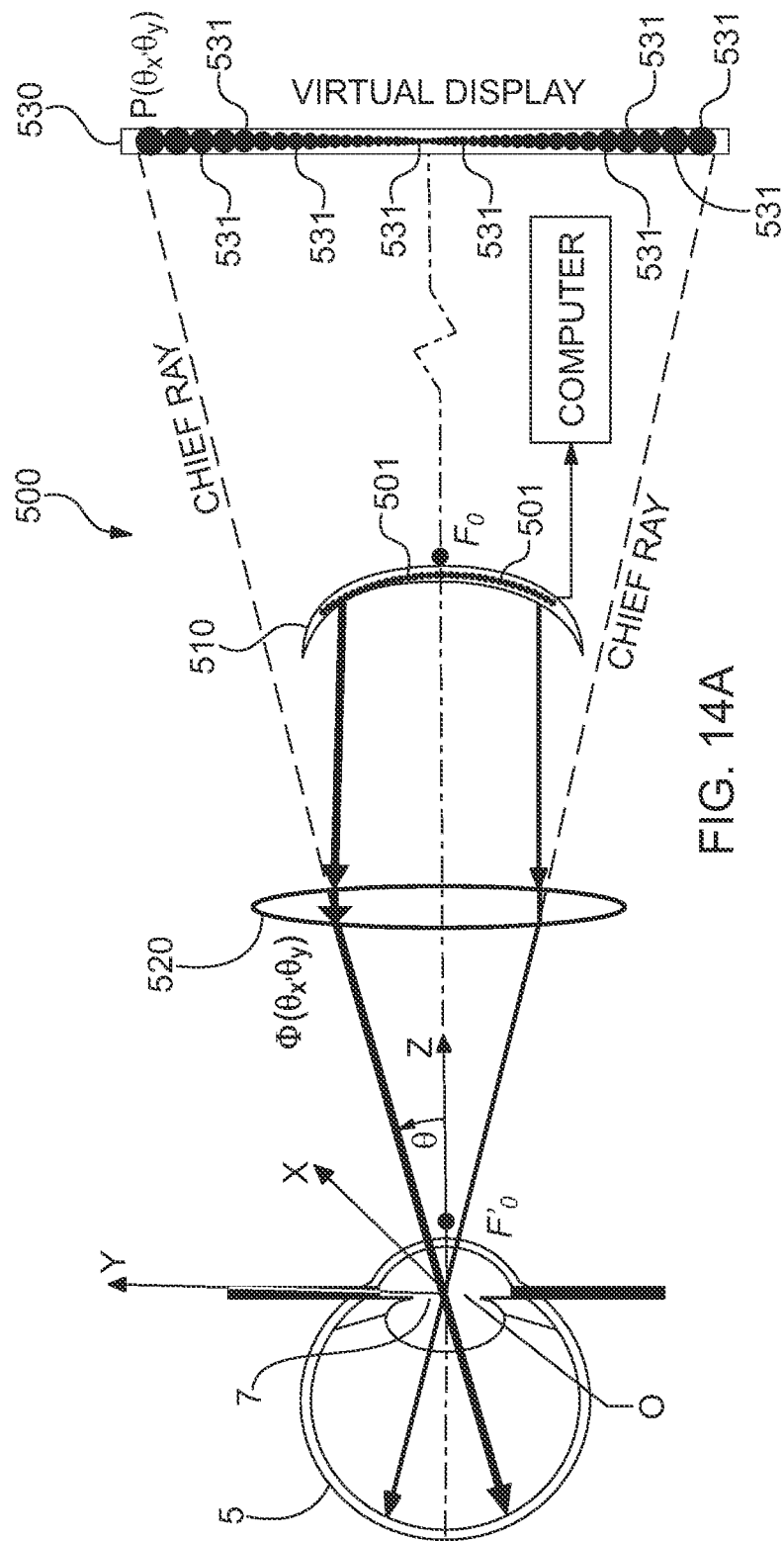
FIG. 14A schematically illustrates an exemplary configuration of a foveated head-mounted display in accordance with the present invention comprising an eyepiece with spatially varying optical power and a microdisplay with a regular pixel pitch on a curved substrate.
Figure 14B:
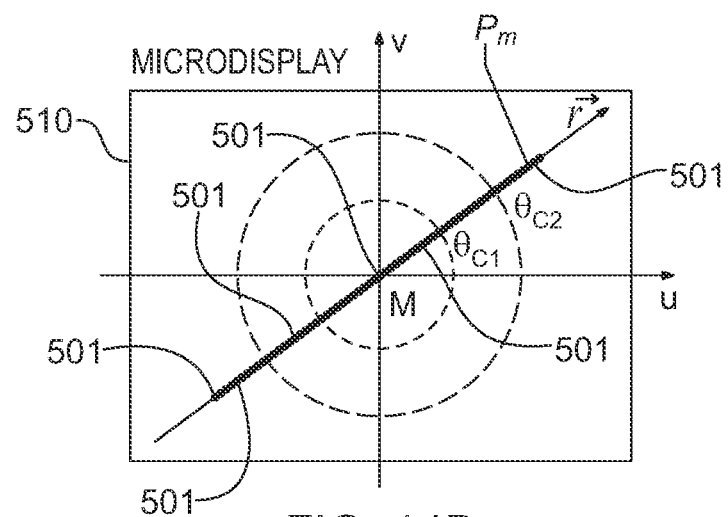
FIG. 14B schematically illustrates an exemplary configuration of the pixel distribution of the curved microdisplay of FIG. 14A.
Figure 14C:
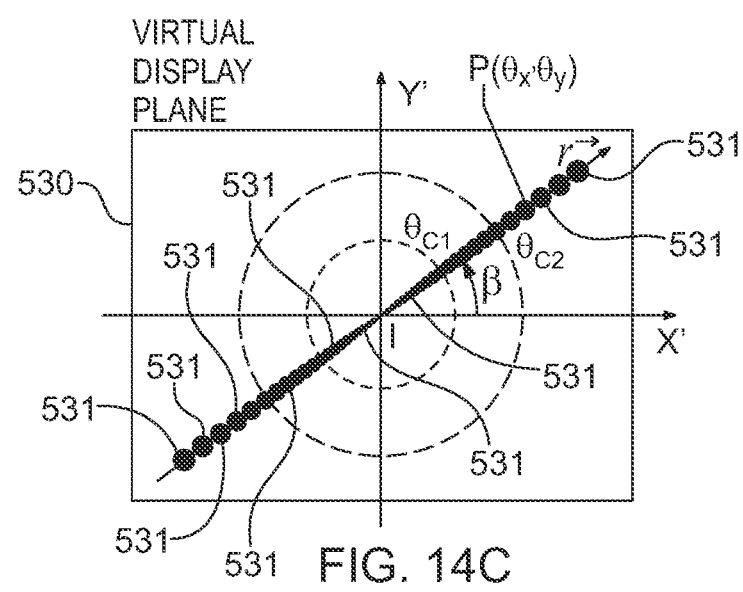
FIG. 14C schematically illustrates an exemplary configuration of the pixel distribution of the virtual display plane of FIG. 14A.

The approach shown in FIG. 11A is limited by the range of optical magnification we can vary while maintaining a constant back focal length to accommodate the physical constraint of a flat microdisplay source. FIG. 14A shows an alternative design 500 in accordance with the present invention which mainly comprises an eyepiece 520 with varying optical power and a curved microdisplay source 510. The pixels of the microdisplay source 510, as illustrated in FIG. 14B, are arranged in a uniform array format with a constant pixel pitch on a curved substrate. A curved microdisplay source 510 can be possibly obtained by shaping the modern flexible displays such as flexible organic light emitting device available through www.oled-info.com/flexible-oled. The eyepiece optics 520, instead of having a fixed focal length or optical power like a conventional eyepiece, is designed to have spatially varying optical magnification or optical power, $\Phi(\theta_x, \theta_y)$, where $(\theta_x, \theta_y)$ are the field angles in horizontal and vertical directions in the visual space. The eyepiece optics 520 magnifies the uniformly-spaced pixels 501 on the curved microdisplay 510 to create a virtual display plane 530 seen by the viewer that appears to have a spatially varying distribution of pixels 531, as illustrated in FIG. 14C, which approximates a desired resolution distribution function.

Figure 15:
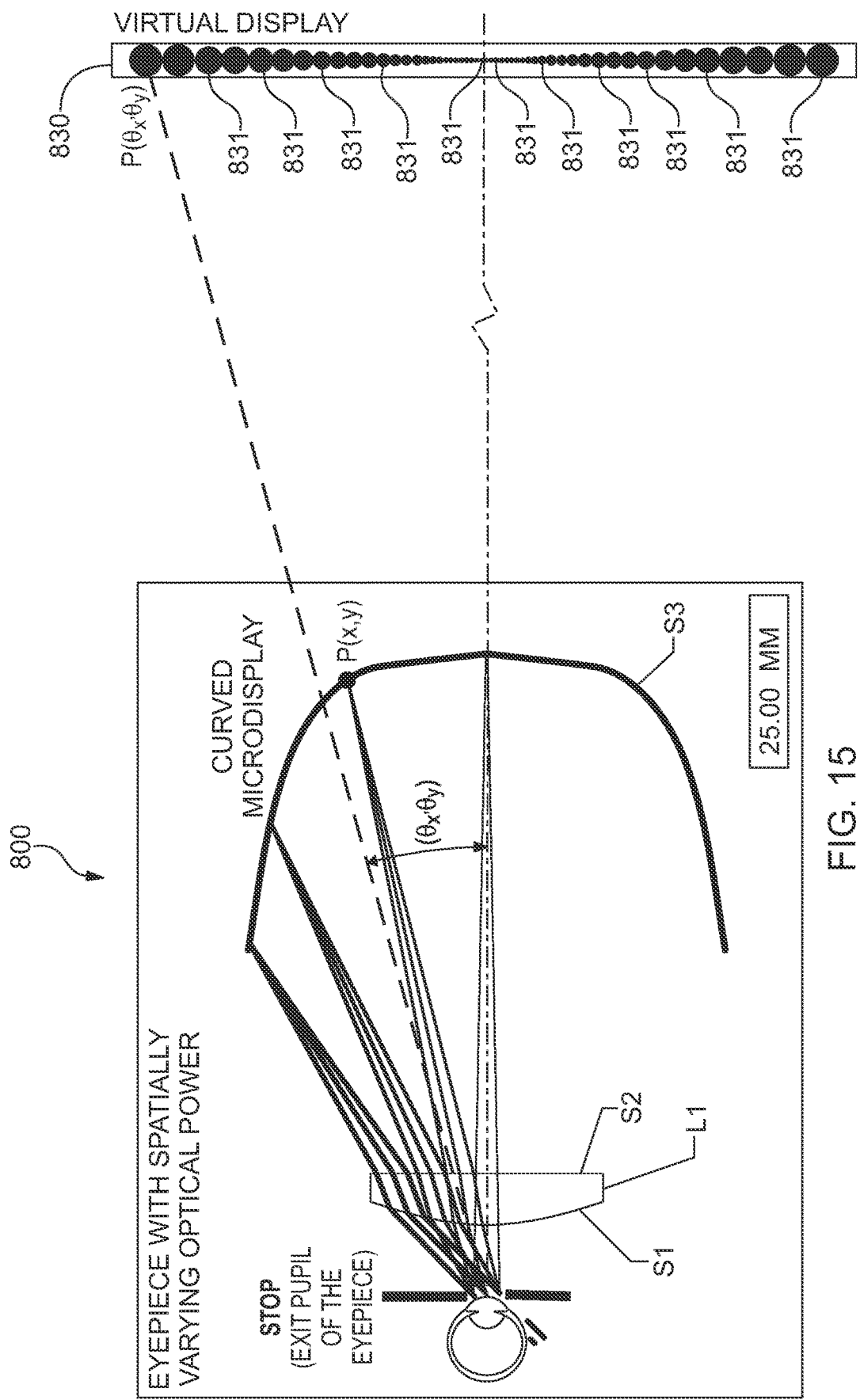
FIG. 15 schematically illustrates an exemplary configuration of an optical layout of a continuously foveated head-mounted display in accordance with the present invention comprising a specially designed freeform eyepiece and a curved microdisplay source.
Figure 16A:
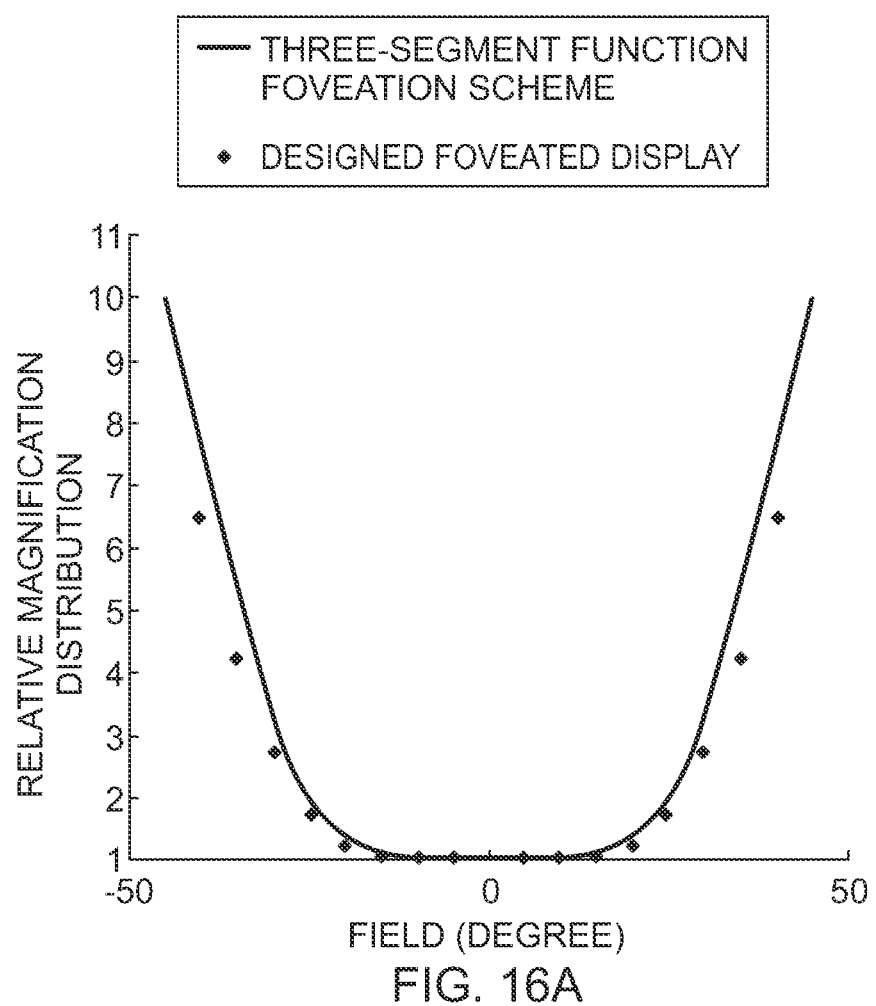
FIG. 16A illustrates a magnification distribution function as a function of field angles for the designed foveated display in diamond-shaped markers and the theoretical 3-segment foveation scheme in Eq. (9)
Figure 16B:
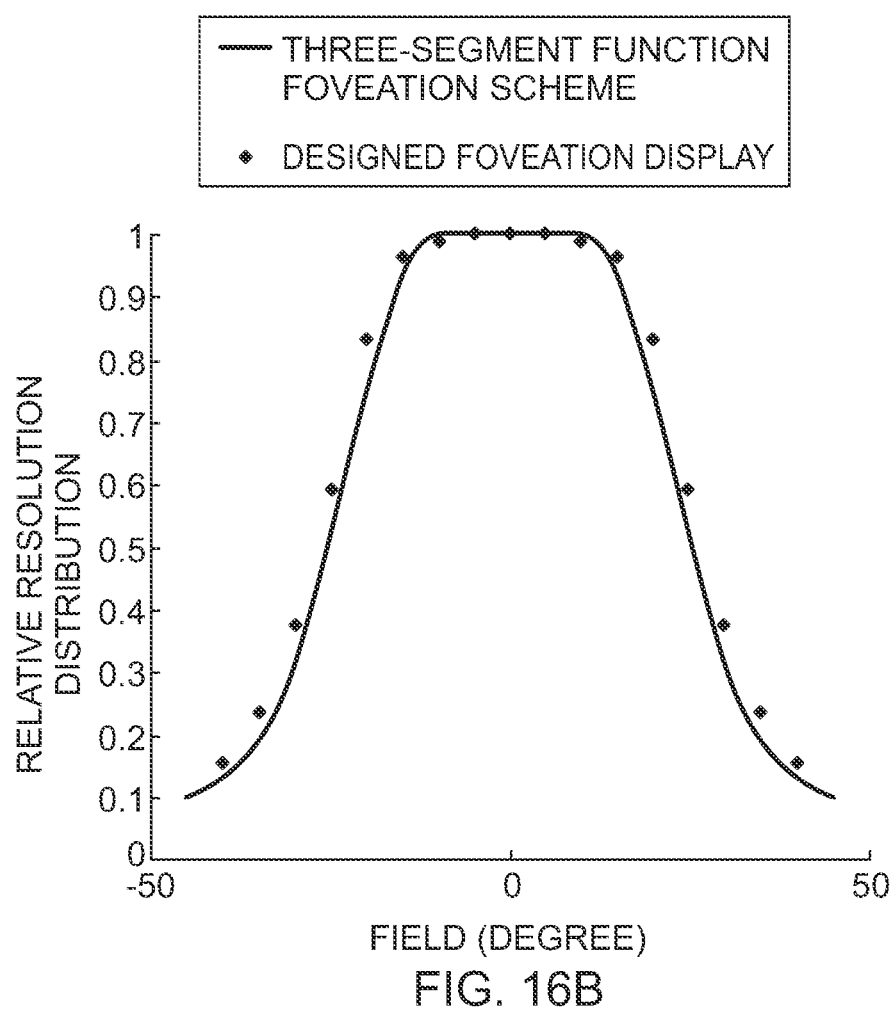
FIG. 16B illustrates a relative resolution distribution function on the virtual display plane as a function of field angles for the designed foveated display in diamond-shaped markers and the theoretical 3-segment foveation scheme in Eq. (9)

FIG. 15 shows an example of a foveated display design 800 in accordance with the present invention comprising a single aspherical lens L1 containing surfaces S1, S2 and a specially curved display source S3 to provide a virtual display 830 with pixels 831. The system 800 achieves a full FOV of 90°. The aspherical lens L1 may be a plano-convex lens with NBK7 glass. The first surface S1 of the lens L1 and the image plane at S3 are both rotationally symmetric aspherical curves. The surface sags of both aspherical surfaces S1, S3 are defined by the following equation $$z = \frac{cr^2}{1+\sqrt{1-(1+k)c^2r^2}} + AR1 \times r + AR2 \times r^2, \quad (17)$$

where r is the radial distance of a point on the surface, and z is the surface sag. The corresponding radius curvature c, conic constant k, and aspheric coefficients AR1 and AR2 are listed in Table 3. This design 800 was specially made to achieve the relative resolution distribution function defined in Eq. (9). FIG. 16A plots the relative magnification distribution of the design 800 as function of field angle (diamond-shaped markers) and in comparison plots the theoretical magnification distribution based on the desired relative resolution distribution in Eq. (9). FIG. 16B illustrates a relative resolution distribution function on the virtual display plane as a function of field angles for the designed foveated display in diamond-shaped markers and the theoretical 3-segment foveation scheme in Eq. (9). In this design, the magnification of the edge field is almost ten times of the center field. We anticipate this design 800 yields a visual experience closely matching the perceived resolution shown in FIGS. 7A-7H.

TABLE 3

Aspherical coefficients for the surface 1 and 3 of the eyepiece design shown in FIG. 15

| Parameters | Surface 1, S1 | Surface 3, S3 (display surface) |
|---|---|---|
| c | 0.01119 | −0.1105 |
| k | −3.4 | −0.9869 |
| AR1 | 0 | −0.1663 |
| AR2 | 0 | 0.05901 |

Figure 17A:
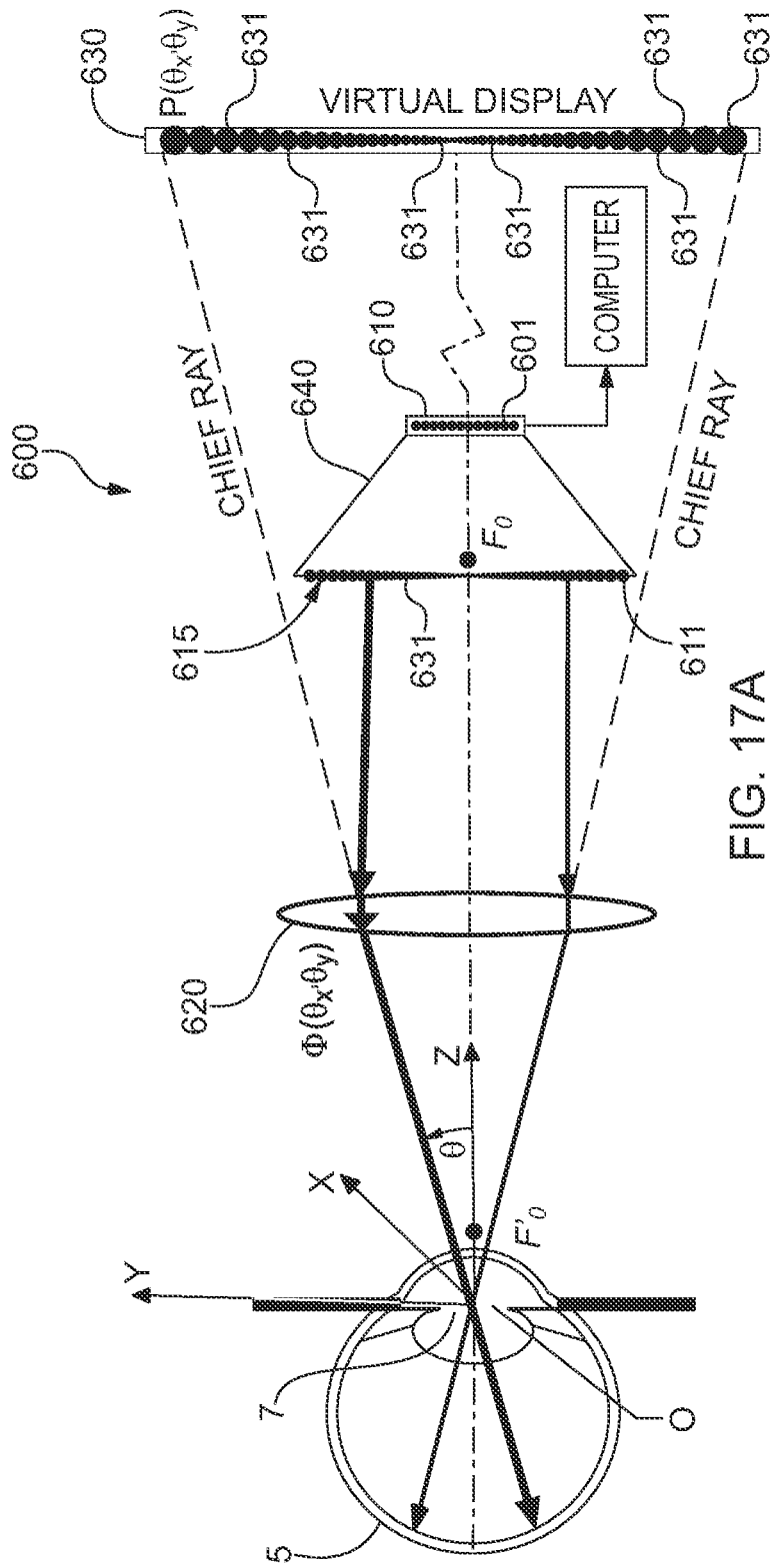
FIG. 17A schematically illustrates an exemplary configuration of a foveated head-mounted display comprising in accordance with the present invention an eyepiece with spatially varying optical power, a flat fiber taper, and a microdisplay with a uniform pixel pitch.
Figure 17B:
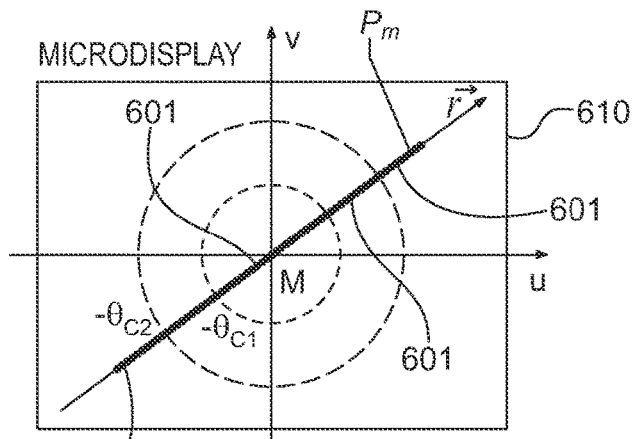
FIG. 17B schematically illustrates an exemplary configuration of the pixel distribution of the microdisplay of FIG. 17A.
Figure 17C:
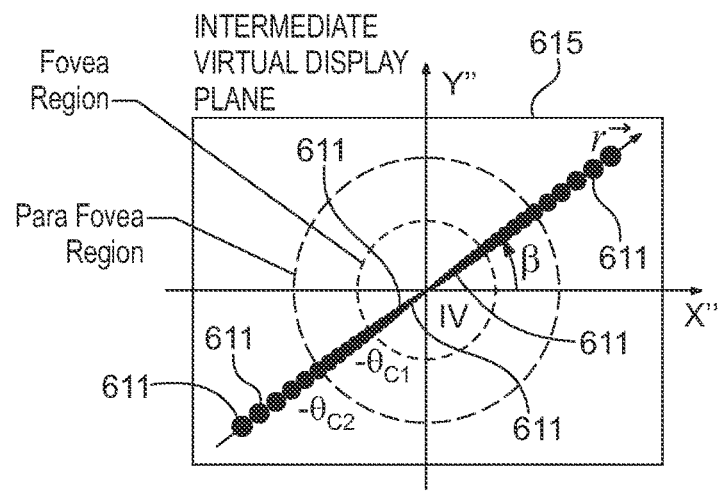
FIG. 17C schematically illustrates an exemplary configuration of the pixel distribution of an intermediate virtual display plane of FIG. 17A.
Figure 17D:
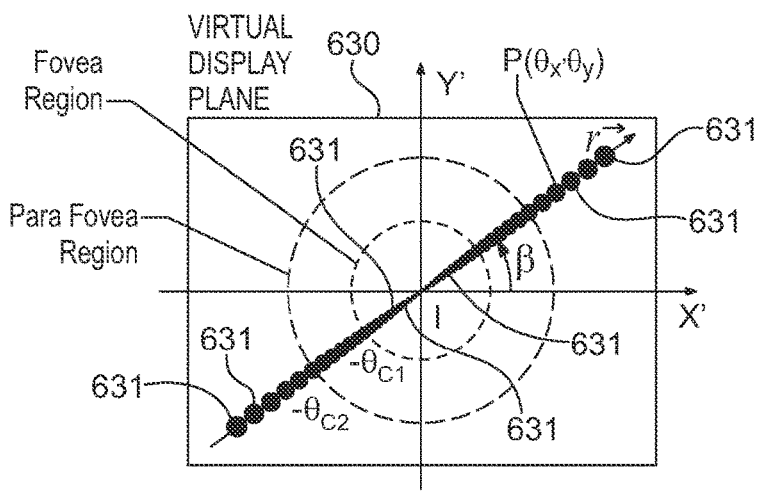
FIG. 17D schematically illustrates an exemplary configuration of the pixel distribution of the virtual display plane of FIG. 17A.

FIG. 17A shows an alternative layout 600 to the scheme shown in FIG. 11A, where the design comprises an eyepiece 620 with varying optical power, a fiber taper 640 and an ordinary flat microdisplay source 610. The pixels 601 of the microdisplay source, as illustrated in FIG. 17B, are arranged in a uniform array format with a constant pixel pitch in both horizontal and vertical directions. Such microdisplays are readily available from many vendors. Examples include but not limited to liquid crystal displays (LCD), liquid crystal on silicon (LCoS) devices, DMD devices, organic light emitting displays (OLED), and many others. The fiber taper 640 which may have a constant or spatially optical magnification, $\Phi_{FP}(\theta_x, \theta_y)$, is inserted between the eyepiece optics 620 and the microdisplay 610 to provide intermediate optical magnification. $(\theta_x, \theta_y)$ is the field angles in horizontal and vertical directions in the visual space. Through the fiber taper 640, an intermediate virtual display 615 is created with pixels 611 magnified by the optical power of the fiber taper 640. As illustrated by FIG. 17C, the distribution of pixels 611 on plane of the intermediate virtual display 615 may be magnified and have a spatially varying resolution when the fiber taper 640 has spatially varying optical magnification. A fiber taper 640 with the required properties can be made by incomusa.com. The eyepiece optics 620, instead of having a fixed focal length or optical power like a conventional eyepiece, is designed to have spatially varying optical magnification or optical power, $\Phi(\theta_x, \theta_y)$. The eyepiece optics 620 magnifies the pixels 611 on the intermediate virtual display plane 615 to create a virtual display plane 630 seen by the viewer that appears to have a spatially varying distribution of pixel 631, as illustrated in FIG. 17D, which approximates a desired resolution distribution function. The combined optical magnification provided by the fiber taper 640 and the eyepiece optics 620 yields adequate optical magnification variation required for producing a large range of magnification distribution.

Figure 18A:
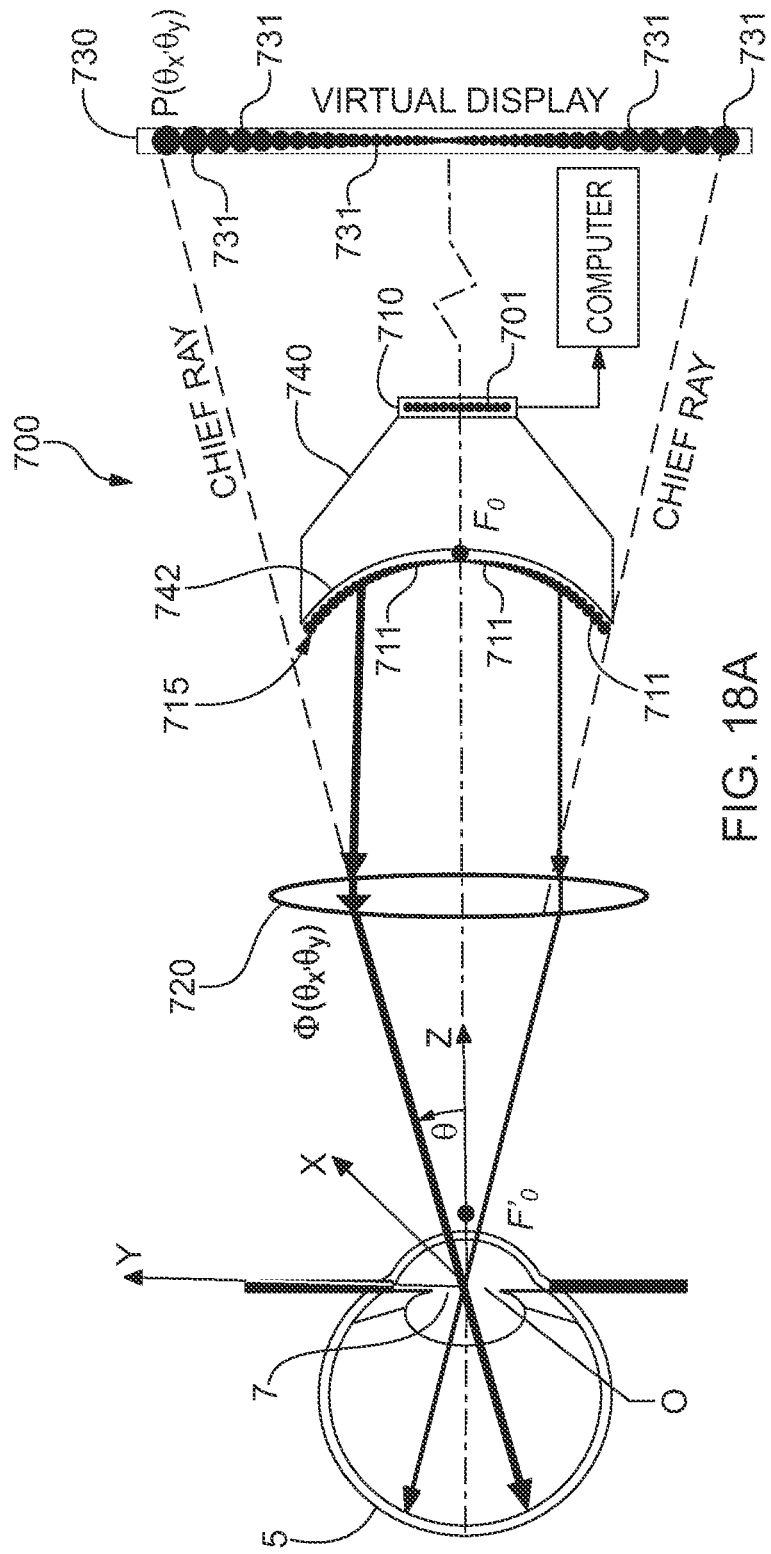
FIG. 18A schematically illustrates an exemplary configuration of a foveated head-mounted display in accordance with the present invention comprising an eyepiece with spatially varying optical power, a curved fiber taper, and a microdisplay with a uniform pixel pitch.
Figure 18B:
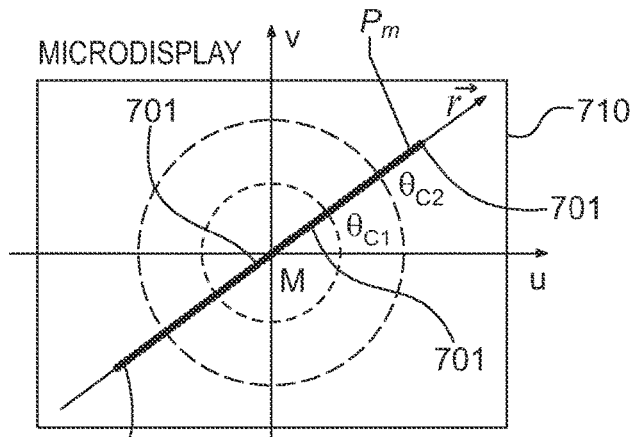
FIG. 18B schematically illustrates an exemplary configuration of the pixel distribution of the microdisplay of FIG. 18A.
Figure 18C:
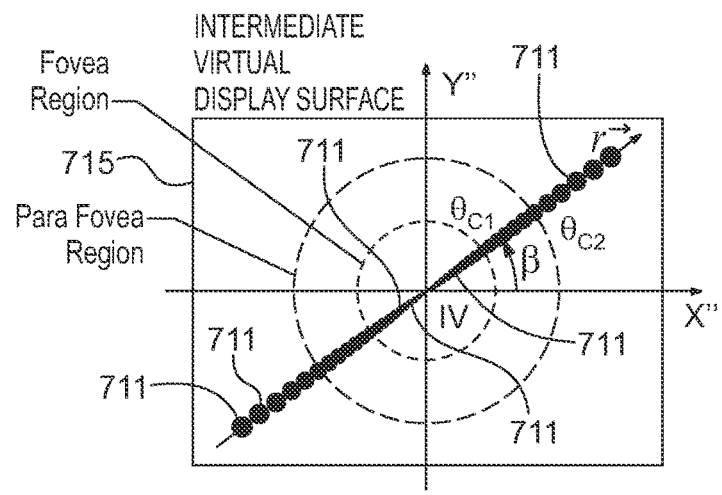
FIG. 18C schematically illustrates an exemplary configuration of the pixel distribution of a intermediate virtual display surface of FIG. 18A.
Figure 18D:
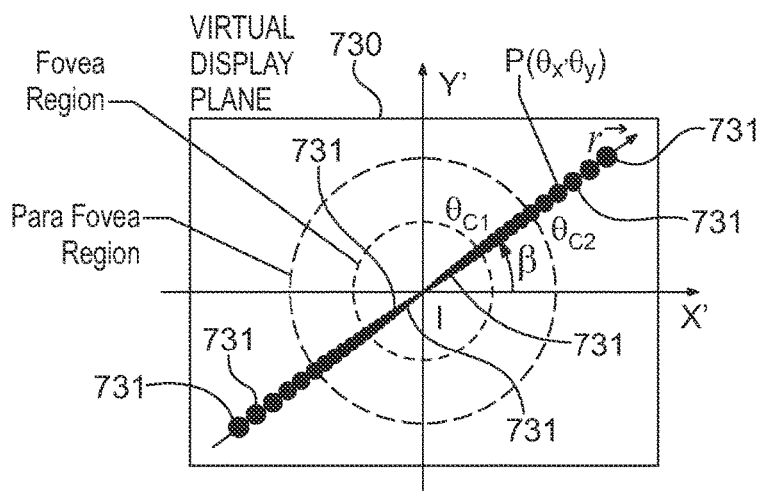
FIG. 18D schematically illustrates an exemplary configuration of the pixel distribution of the virtual display plane of FIG. 18A.

FIG. 18A shows an alternative layout 700 to the scheme shown in FIG. 17A, where the design comprises an eyepiece 720 with varying optical power, a curved fiber taper 740 and an ordinary flat microdisplay source 710. The pixels 701 of the microdisplay source 710, as illustrated in FIG. 18B, are arranged in a uniform array format with a constant pixel pitch in both horizontal and vertical directions. Such microdisplays are readily available from many vendors. Examples include but not limited to liquid crystal displays (LCD), liquid crystal on silicon (LCoS) devices, DMD devices, organic light emitting displays (OLED), and many others. A curved fiber taper 740 which has a spatially optical magnification, $\Phi_{FP}(\theta_x, \theta_y)$, is inserted between the eyepiece optics 720 and the microdisplay 710 to provide intermediate optical magnification. $(\theta_x, \theta_y)$ is the field angles in horizontal and vertical directions in the visual space. The out-coupling surface of the taper 740 may also have a curved surface 742. Through the fiber taper 740, an intermediate virtual display 715 is created with pixels 711 magnified by the optical power of the fiber taper 740. As illustrated by FIG. 18C, the pixel distribution on the intermediate virtual display plane 715 may be magnified and have a spatially varying resolution. A fiber taper 740 with the required properties can be made by incomusa.com. The eyepiece optics 710, instead of having a fixed focal length or optical power like a conventional eyepiece, is designed to have spatially varying optical magnification or optical power, $\Phi(\theta_x, \theta_y)$. The eyepiece optics 710 magnifies the pixels 711 on the intermediate virtual display plane 715 to create a virtual display plane 730 seen by the viewer that appears to have a spatially varying distribution of pixels 731, as illustrated in FIG. 18D, which approximates a desired resolution distribution function. The combined optical magnification provided by the fiber taper 740 and the eyepiece optics 710 yields adequate optical magnification variation required for producing a large range of magnification distribution.

Experimental Demonstration of a Continuously Foveated Display

By utilizing the metrics for data efficiency and perceived image quality described earlier, we can iteratively optimize the key parameters shown in Eq. (2) to obtain a static foveated display offering a balance between quality and data saving without the need for eyetracker or scanning mechanism. For instance, Eq. (9) is an example of a relative resolution distribution function obtained through our optimization process, in which $\theta_{c1}=15°$ and $\theta_{c2}=30°$. The display maintains a constant peak resolution across ±15°, but it drops to 30%, 13%, and 8% of its peak resolution at ±30°, ±40°, and ±50°, respectively. Such a foveated display with 130-degree FOV yields a data saving efficiency as high as about 90%. Within the range of ±15° of eye rotation, the perceived display quality is almost completely as high as the VA limit of the HVS. When the eye rotates to a 25-degree angle, the perceived resolution drops to about 51% of the peak resolution.

Figure 19A:
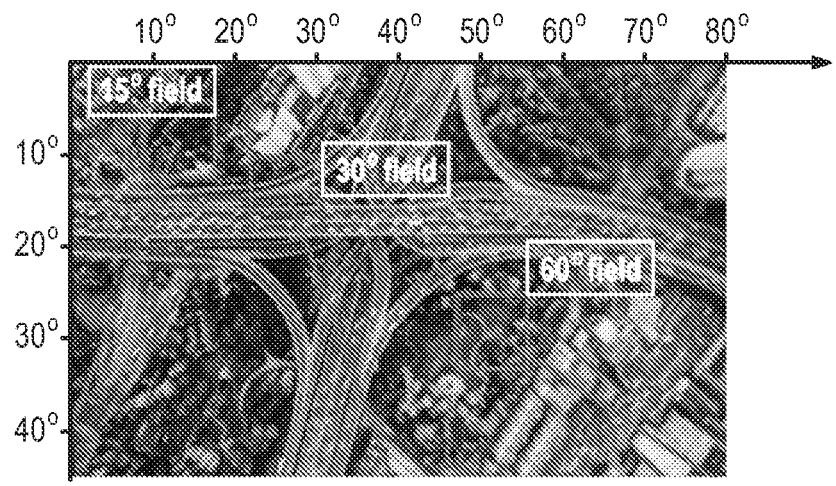
FIG. 19A illustrates a captured image of a foveated image rendered on a 4K monitor using a prototype device in accordance with the present invention.
Figure 19B:
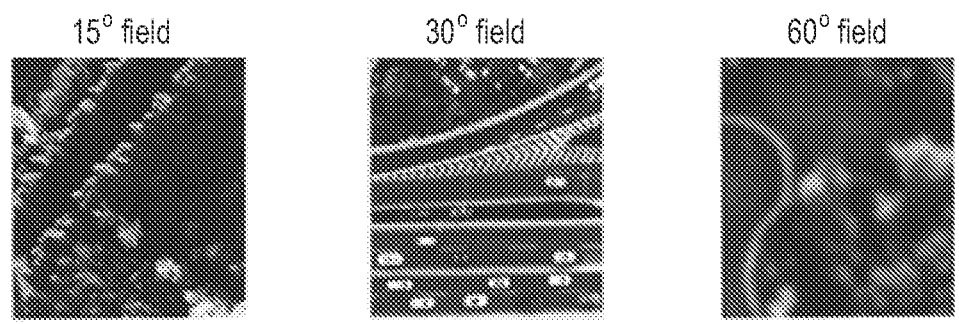
FIG. 19B illustrates zoomed in views of the images of FIG. 19A corresponding the viewing angle of 15, 30, and 60 degrees.
Figure 19C:
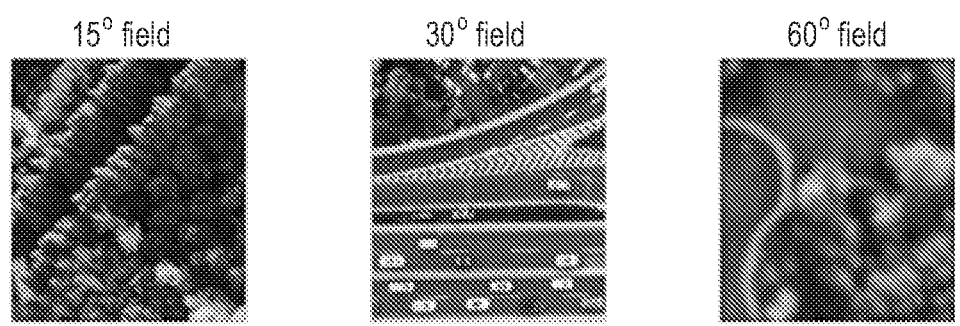
FIG. 19C illustrates 3 rendered images of the same local areas of FIG. 19B perceived by a standard observer with the eye rotated at the angles of 15, 30, and 30 degrees, respectively.

As demonstrated through examples in FIGS. 10A-18D, the implementation of such a static foveation approach in an HMD system can be achieved by controlling the optical magnification of the viewing optics, and we are working on a prototype design and fabrication based on FIG. 12. To demonstrate the visual effects of such a display, we used a 27" 4K monitor as our test display. When viewed at a distance of 107 mm away, the monitor effectively created a display FOV of 80 degrees in the horizontal direction and angular resolution of 0.5 arcminutes per display pixel. To demonstrate the visual quality, we chose a high-resolution 4K image and computed the foveated image by convolving the original image with the relative resolution distribution function as a filter. To maximize the range of field angles that can be tested through this testbed, we assume the top-left corner to be the center (0,0) field when applying the filter. A 2K digital camera was placed at the anticipated viewing position to replace a viewer's eye and capture images. FIG. 19A shows the captured image of the entire FOV for overall effects. Then a camera lens of 50 mm focal length, which offers an angular resolution of about 0.25 arcminutes per pixel, was utilized to capture zoomed-in views of three different viewing angles corresponding to 15°, 30°, and 60° field angles, respectively, as if the eye rotates and foveates at these angles. The zoomed-in views are shown as 3 inset images at first line in FIG. 19B, respectively. As expected, the captured images show noticeable degradation from the center to the 80-degree angle. As a comparison, FIG. 19C shows 3 images of the same local areas perceived by a standard observer with the eye rotated at the angles of 15°, 30°, and 30°, respectively, when the original full-resolution was displayed. These images were obtained by convolving the original image with the human relative resolution distribution function as a filter. It is worth mentioning that considering the comfortable eye rotation angle the last example for the 60-degree field assumes the fovea is aimed at a 30-degree field rather than directly at 60-degrees. These comparison images clearly show the static foveated rendering method yield visually similar image quality to the perceived image quality of the original full-resolution image, which is a strong evidence that the proposed foveated method may render visually imperceptible quality degradation. In the future work, we will perform perception-based studies to validate the perceived acceptance of this approach and iteratively optimize the foveation function for minimal perceptual artifacts.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

REFERENCES

1. L. C. Loschky and G. W. McConkie, "Investigating spatial vision and dynamic attentional selection using a gaze contingent multiresolutional display," Q. J. Exp. Psychol. A 8, 99-117 (2002).
2. W. Zhou and A. C. Bovik, "Embedded foveation image coding," IEEE Trans. Image Process. 10, 1397-1410, 2001.
3. A. T. Duchowski and A. Çötekin, "Foveated gaze-contingent displays for peripheral LOD management, 3D visualization, and stereo imaging," ACM Trans. Multimedia Comput. Commun. Appl. 3, 1-21 (2007)
4. G. Sandini, et al, "A retinalike CMOS sensor and its applications," in Proceedings of IEEE Workshop on Sensor Array and Multichannel Signal Processing (IEEE, 2000), pp. 514-519.
5. D. V. Wick et al, "Foveated imaging demonstration," Opt. Express 10, 60-65, 2002.
6. H. Hua and S. Liu, "Dual-sensor foveated imaging system," Applied Optics, 47(3), 2007.
7. J. P. Rolland, et al, "High resolution inset head-mounted display," Appl. Opt. 37, 4183-4193, 1998.
8. Tan G, et al Foveated imaging for near-eye displays. Optics express, 26(19), 2018.
9. K. Iwamoto, S. Katsumata, K. Tanie, "An eye movement tracking type head mounted display for virtual reality system: -evaluation experiments of a prototype system", Proceedings of 1994 IEEE International Conference on Systems, Man, and Cybernetics. Humans, Information and Technology (Cat. No. 94CH3571-5). vol. 1, pp. 113-18, 1994.
10. W. S. Geisler and J. S. Perry, "Real-time foveated multiresolution system for low-bandwidth video communication," Proc. SPIE 3299, 294-305 (1998).
11. L. C. Loschky, G. W. McConkie, H. Yang, and M. E. Miller, "The limits of visual resolution in natural scene viewing," Visual Cognition 12, 1057-1092 (2005).
12. Burgess-Limerick R, Mon-Williams M, Coppard V L. Visual display height. Human Factors. 2000 March; 42(1):140-50.
13. Cook G, Stark L. Derivation of a model for the human eye-positioning mechanism. The bulletin of mathematical biophysics. 1967 Mar. 1; 29(1):153-74.

Various citations and references are cited herein, each of which is incorporated herein by reference in their entirety.

The invention claimed is:

1. A perceptual-driven continuously foveated display with specified resolution across the display, the display having a display plane with a plurality of pixels, where the location of the pixels on the perceptual-driven continuously foveated display is distributed according to the angular pixel density function given by the equation $$F_{FD}(\theta_x, \theta_y) = \begin{cases} f_1(\theta_x, \theta_y) & \text{when } \theta \leq \theta_{C1}(\vec{r}) \\ f_2(\theta_x, \theta_y) & \text{when } \theta_{C1}(\vec{r}) \leq \theta \leq \theta_{C2}(\vec{r}) \\ f_3(\theta_x, \theta_y) & \text{when } \theta_{C2}(\vec{r}) \leq \theta \leq \theta_{C3}(\vec{r}), \\ \vdots \\ f_{N+1}(\theta_x, \theta_y) & \text{when } \theta \geq \theta_{CN}(\vec{r}) \end{cases}$$

where $\theta$ is the field angle of a pixel position P on the display plane along a given direction $\vec{r}$ and $\theta$ is defined as the angular deviation of the pixel position from a Z-axis perpendicular to the display plane of the OXYZ reference system in the unit of degrees; $\theta_x$ and $\theta_y$ correspond to an X-component and a Y-component of the field angle $\theta$ in the horizontal (X) and vertical (Y) directions, respectively; N is the number of critical balance points (N≥1); $\theta_{C1}(\vec{r}), \theta_{C2}(\vec{r}), \ldots,$ and $\theta_{CN}(\vec{r})$ are the balance points arranged along the given radial direction $\vec{r}$ in the order from the smallest to the largest angular distance from the center I; and, $f_1, f_2, \ldots f_{N+1}$ are N+1 segmented functions that characterize the relative resolution distribution within each corresponding region, and $f_1(\theta) = f_2(\theta)$ when $\theta = \theta_{C1}$, whereby transition artifacts located at transitions between adjacent segmented functions is minimized.

2. The perceptual-driven continuously foveated display of claim 1, wherein $f_i(\theta) = f_{i+1}(\theta)$ when $\theta = \theta_{Ci}$, $2 \leq i \leq N$.

3. The perceptual-driven continuously foveated display of claim 1, $$F_{FD}(\theta_x, \theta_y) = \begin{cases} f_1(\theta_x, \theta_y) & \text{when } |\theta| \leq \theta_{C1}(\vec{r}) \\ f_2(\theta_x, \theta_y) & \text{when } \theta_{C1}(\vec{r}) \leq |\theta| \leq \theta_{C2}(\vec{r}) \\ f_3(\theta_x, \theta_y) & \text{when } |\theta| \geq \theta_{C2}(\vec{r}) \end{cases} \text{ and}$$

$f_1(\theta) = f_2(\theta)$ when $|\theta| = \theta_{C1}$.

4. The perceptual-driven continuously foveated display of claim 3, wherein $f_2(\theta) = f_3(\theta)$ when $|\theta| = \theta_{C2}$.

5. The perceptual-driven continuously foveated display of claim 1, wherein $F_{FD}(\theta) =$ $$\begin{cases} 1 & \text{when } |\theta| \leq 10° \\ e^{-0.003(\theta-10)^2} & \text{when } 10° \leq |\theta| \leq 30° \\ \dfrac{2.3}{2.3 + (\theta - 24.68)} \cong A + B\theta^{-1} + C\theta^{-2} + D\theta^{-3} & \text{when } |\theta| \geq 30° \end{cases},$$

where $A = -0.0028$; $B = 10.1602$; $C = -6.8588 \times 10^2$;

$D = 1.9659 \times 10^4$; $\theta_{c1} = 10°$; and $\theta_{c2} = 30°$.

where $A = -0.0028$; $B = 10.1602$; $C = -6.8588 \times 10^2$; $D = 1.9659 \times 10^4$; $\theta_{c1} = 10°$; and $\theta_{c2} = 30°$.

6. The perceptual-driven continuously foveated display of claim 1, wherein $F_{FD}(\theta) = e^{-0.0005 \times \theta^2}$.

7. The perceptual-driven continuously foveated display of claim 1, wherein the display comprises raster scanning.

8. The perceptual-driven continuously foveated display of claim 1, wherein the display comprises a laser scanning display.

9. The perceptual-driven continuously foveated display of claim 1, comprising a microdisplay and an eyepiece configured to create a virtual image of the microdisplay, wherein the virtual image includes images of the pixels spaced according to the angular pixel density function $F_{FD}$.

10. The perceptual-driven continuously foveated display of claim 9, wherein the microdisplay includes pixels spaced according to the angular pixel density function.

11. The perceptual-driven continuously foveated display of claim 10, wherein the geometrical pixel pitch, $p_m$, is given by the equation $p_m(u, v) =$ $$\dfrac{L}{m_0 \cos^2\left(\arctan\left(\dfrac{m_0\sqrt{u^2+v^2}}{L}\right)\right)} \tan\left(\dfrac{\arctan\left(\dfrac{m_0 p_{m0}}{L}\right)}{F_{FD}\left(\arctan\left(\dfrac{m_0 u}{L}\right), \arctan\left(\dfrac{m_0 u}{L}\right)\right)}\right),$$

where u and v are the coordinates of the pixel on the microdisplay coordinate system MUVW, M is the origin of the microdisplay coordinate system, $p_{m0}$ is a pixel pitch at the origin M of the microdisplay source, $m_0$ is an optical magnification of the eyepiece, given as $$m_0 = \dfrac{f_{EP}}{f_{EP} - Z_{MD}},$$

$f_{EP}$ is the focal length of the eyepiece, $z_{MD}$ is the distance from a rear principal plane, $P_{EP}$, of the eyepiece to the microdisplay source, and $z_{ER}$ is the distance from the front principal plane, $P'_{EP}$, of the eyepiece to the exit pupil of the eyepiece, and $F_{FD}(\theta_x, \theta_y)$ is the desired relative resolution distribution function on the virtual display plane.

12. The perceptual-driven continuously foveated display of claim 9, wherein the microdisplay includes pixels spaced with a uniform pixel pitch.

13. The perceptual-driven continuously foveated display of claim 9, wherein the eyepiece includes a lens with spatially varying optical power.

14. The perceptual-driven continuously foveated display of claim 13, wherein the spatially varying optical power is given by the equation $$\Phi(\theta_x, \theta_y) = \dfrac{1}{P_{m0} \cos^2\left(\arctan\left(\sqrt{\tan^2\theta_x + \tan^2\theta_y}\right)\right)} \tan\left(\dfrac{\arctan(\Phi_0 p_{m0})}{F_{FD}(\theta_x, \theta_y)}\right),$$

where $\Phi_0$ is the optical power for the center field $\theta = 0$, and is expressed as $$\Phi_0 = \dfrac{\tan(p_{a0})}{p_{m0}};$$

$p_{a0}$ is a desired angular resolution in arcminutes for the central field of the virtual image; and $p_{m0}$ is a pixel pitch on the microdisplay.

15. The perceptual-driven continuously foveated display of claim 13, wherein the lens has from the center of a field of view to ±40° edge fields a relative optical magnification, $$m(\theta_x, \theta_y) = \dfrac{\Phi(\theta_x, \theta_y)}{\Phi_0},$$

where $\theta_x$ and $\theta_y$ correspond to an X-component and a Y-component of a field angle $\theta$ in the horizontal (X) and vertical (Y) directions, respectively; $\Phi(\theta_x, \theta_y)$ is the optical power of the lens; and $\Phi_0$ is the optical power at the central field.

16. The perceptual-driven continuously foveated display of claim 13, wherein the spatially varying optical power monotonically increases by 4 times from the center of the field of view to 40°.

17. The perceptual-driven continuously foveated display of claim 13, wherein the relative angular resolution of the virtual display image reduces by about 4 times from the value of 1 at center field and to about 0.25 at the ±40°.

18. The perceptual-driven continuously foveated display of claim 13, wherein the relative angular resolution of the virtual display is greater than 0.75 for field angles up to ±30°.

19. The perceptual-driven continuously foveated display of claim 9, wherein the microdisplay is curved.

20. The perceptual-driven continuously foveated display of claim 9, comprising a fiber taper optically coupled to the microdisplay.

21. The perceptual-driven continuously foveated display of claim 20, wherein fiber taper is curved.

22. A lens with spatially varying optical power, the varying optical power given by the equation $$\Phi(\theta_x, \theta_y) = \frac{1}{P_{m0}\cos^2\left(\arctan\left(\sqrt{\tan^2\theta_x + \tan^2\theta_y}\right)\right)} \tan\left(\frac{\arctan(\Phi_0 p_{m0})}{F_{FD}(\theta_x, \theta_y)}\right),$$

where $\Phi_0$ is the optical power for the center field $\theta=0$, and is expressed as $$\Phi_0 = \frac{\tan(p_{a0})}{p_{m0}};$$

$p_{a0}$ is a desired angular resolution in arcminutes for the central field of a virtual display; $p_{m0}$ is a pixel pitch on a microdisplay; and $\theta_x$ and $\theta_y$ correspond to an X-component and Y-component of the field angle $\theta$ in the horizontal (X) and vertical (Y) directions, respectively;

and $F_{FD}(\theta_x, \theta_y)$ is the desired relative resolution distribution function on the virtual display.

23. The lens with spatially varying optical power of claim 22, comprising from the center of a field of view to ±40° edge fields a relative optical magnification, $$m(\theta_x, \theta_y) = \frac{\Phi(\theta_x, \theta_y)}{\Phi_0},$$

where $\theta_x$ and $\theta_y$ correspond to an X-component and a Y-component of a field angle $\theta$ in the horizontal (X) and vertical (Y) directions, respectively; $\Phi(\theta_x, \theta_y)$ is the optical power of the lens; and $\Phi_0$ is the optical power at the central field.

24. The lens with spatially varying optical power of claim 22, wherein the varying optical power monotonically increases by 4 times from the center of the field of view to 40°.

25. The lens with spatially varying optical power of claim 22, wherein the relative angular resolution of the lens reduces by about 4 times from the value of 1 at the center field and to about 0.25 at ±40°.

26. The lens with spatially varying optical power of claim 22, wherein the relative angular resolution of the lens for field angles up to ±30 is greater than 0.75 of the resolution at the center of the lens.

* * * * *